(12) United States Patent
Asami et al.

(10) Patent No.: US 10,295,799 B2
(45) Date of Patent: May 21, 2019

(54) IMAGING LENS AND IMAGING APPARATUS

(71) Applicant: NANCHANG O-FILM OPTICAL-ELECTRONIC TECH CO., LTD., Nanchang (CN)

(72) Inventors: Taro Asami, Saitama (JP); Takeshi Kamiya, Saitama (JP)

(73) Assignee: NANCHANG O-FILM OPTICAL-ELECTRONIC TECH CO., LTD., Nanchang (CN)

( * ) Notice: Subject to any disclaimer, the term of this patent is extended or adjusted under 35 U.S.C. 154(b) by 0 days.

(21) Appl. No.: 15/619,991

(22) Filed: Jun. 12, 2017

(65) Prior Publication Data
US 2018/0024334 A1   Jan. 25, 2018

(30) Foreign Application Priority Data
Jul. 20, 2016   (JP) ................... 2016-142472

(51) Int. Cl.
*G02B 9/34* (2006.01)
*G02B 13/14* (2006.01)
*G02B 13/00* (2006.01)
*G02B 26/00* (2006.01)
*G02B 27/00* (2006.01)

(52) U.S. Cl.
CPC ......... *G02B 13/146* (2013.01); *G02B 13/004* (2013.01); *G02B 13/0005* (2013.01); *G02B 26/002* (2013.01); *G02B 9/34* (2013.01); *G02B 27/005* (2013.01); *G02B 27/0025* (2013.01)

(58) Field of Classification Search
CPC .............. G02B 13/0005; G02B 13/146; G02B 13/004; G02B 26/002; G02B 9/34; G02B 27/0025
USPC .......................... 359/644, 687, 774, 772, 771
See application file for complete search history.

(56) References Cited

U.S. PATENT DOCUMENTS

| 4,484,802 A | * | 11/1984 | Kikuchi | ................. G02B 13/24 359/660 |
| 6,747,810 B2 | * | 6/2004 | Sato | ......................... G02B 9/34 359/715 |

FOREIGN PATENT DOCUMENTS

JP   2000-028914 A   1/2000

\* cited by examiner

*Primary Examiner* — James R Greece
*Assistant Examiner* — Travis S Fissel
(74) *Attorney, Agent, or Firm* — Hodgson Russ LLP

(57) ABSTRACT

The imaging lens consists of, in order from an object side, a positive first lens L1, a negative second lens L2, a positive third lens L3, and a positive fourth lens L4. Conditional expressions relating to a focal length f of an entire system, a combined focal length f234 of the second lens L2 to the fourth lens L4, an Abbe number vd1 of the first lens L1, an Abbe number vd2 of the second lens L2, a radius of curvature R1 of a surface of the first lens L1 on the object side, and a radius of curvature R2 of a surface of the first lens L1 on an image side: $0.4<f/f234<2$; $vd1<50$; $5<vd1-vd2<26$; $-5<(R1+R2)/(R1-R2)<-0.9$ are satisfied.

20 Claims, 24 Drawing Sheets

EXAMPLE 1

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

EXAMPLE 12

EXAMPLE 13

EXAMPLE 14

EXAMPLE 15

EXAMPLE 2

IMAGING LENS AND IMAGING APPARATUS

CROSS-REFERENCE TO RELATED APPLICATIONS

The present application claims priority under 35 U.S.C. § 119 to Japanese Patent Application No. 2016-142472, filed on Jul. 20, 2016. Each of the above application(s) is hereby expressly incorporated by reference, in its entirety, into the present application.

BACKGROUND OF THE INVENTION

1. Field of the Invention

The present invention relates to an imaging lens and an imaging apparatus, and in particular, an imaging lens suitable for use in driver monitoring, and an imaging apparatus including the imaging lens.

2. Description of the Related Art

In recent years, a driver monitoring system which images a driver of a vehicle or the like, detects dozing and/or looking-aside of the driver from an image, and gives a warning has been developed. In general, since an imaging lens and an imaging element which image the driver in this system are provided on a dashboard in an upper portion of a speedometer or in a narrow space inside the speedometer, there is demand for an imaging lens which has a small number of lenses and is reduced in size.

Of the imaging lenses known in the related art, as an imaging lens which is for an imaging element and has a small number of lenses, for example, an imaging lens having a four-lens configuration described in JP2000-28914A is known. JP2000-28914A describes a lens system in which a stop, a biconvex lens, a biconcave lens, a biconvex lens, and a biconvex lens are provided in order from an object side.

SUMMARY OF THE INVENTION

In the driver monitoring system, the captured image is analyzed by software, and dozing and/or looking-aside of the driver is detected from, in particular, the movement of the eyelids and eyeballs of the driver. For this reason, since an appropriate number of pixels need to be allocated to a region of the imaging element corresponding to the eyelids and the eyeballs, and deviation of a sitting position of the driver needs to be taken into consideration, there is an appropriate angle of view in the imaging lens. Light which is used for imaging is different depending on the system, and visible light, near infrared light, and far infrared light may be used alone or in combination. In a system which is usable not only in the daytime, but also in the nighttime or in a dark environment, such as a tunnel, there is demand for an imaging lens capable of coping with both of visible light and near infrared light.

However, in the imaging lens described in JP2000-28914A, since the angle of view is narrow, there is a concern that the eyelids or the pupils are out of an imaging visual field in a case where the sitting position of the driver is deviated, or the like. In JP2000-28914A, there is no description about design taking a region of near infrared light into consideration, and characteristics in the region of near infrared light are not disclosed.

The invention has been accomplished in consideration of the above-described situation, and an object of the invention is to provide an imaging lens having an angle of view suitable for use in driver monitoring and having satisfactory performance in a region of visible light to near infrared light, and an imaging apparatus including the imaging lens.

An imaging lens of the invention consists of, in order from an object side, a first lens having positive refractive power, a second lens having negative refractive power, a third lens having positive refractive power, and a fourth lens having positive refractive power, and all of the following conditional expressions (1) to (4) are satisfied;

$$0.4 < f/f234 < 2 \tag{1}$$

$$vd1 < 50 \tag{2}$$

$$5 < vd1 - vd2 < 26 \tag{3}$$

$$-5 < (R1+R2)/(R1-R2) < -0.9 \tag{4}$$

where
f: a focal length of an entire system
f234: a combined focal length of the second lens, the third lens, and the fourth lens
vd1: an Abbe number for d-line of the first lens
vd2: an Abbe number for d-line of the second lens
R1: a radius of curvature of a surface of the first lens on the object side
R2: a radius of curvature of a surface of the first lens on an image side.

In the imaging lens of the invention, it is preferable that at least one or an arbitrary combination of the following conditional expressions (1-1) and (5) to (9) is satisfied;

$$0.55 < f/f234 < 1.45 \tag{1-1}$$

$$0.2 < D1/f \tag{5}$$

$$27 < (vd3+vd4)/2 - vd2 < 34 \tag{6}$$

$$-30 < vd1 - (vd3+vd4)/2 < -3 \tag{7}$$

$$-2.5 < (R8+R9)/(R8-R9) < -0.5 \tag{8}$$

$$40° < 2\omega < 60° \tag{9}$$

where
f: the focal length of the entire system
f234: the combined focal length of the second lens, the third lens, and the fourth lens
D1: a thickness of the first lens on an optical axis
vd3: an Abbe number for d-line of the third lens
vd4: an Abbe number for d-line of the fourth lens
vd2: the Abbe number for d-line of the second lens
vd1: the Abbe number for d-line of the first lens
R8: a radius of curvature of a surface of the fourth lens on the object side
R9: a radius of curvature of a surface of the fourth lens on the image side
2ω: a maximum full angle of view, the unit of which is degree)(°.

An imaging apparatus of the invention comprises the imaging lens of the invention.

The term "consists of" means substantial components, and the imaging lens of the invention may include, in addition to the components listed above, lenses substantially having no power, optical elements, such as a stop, a filter, and a cover glass, other than the lenses, mechanical parts, such as a lens flange, a lens barrel, and a vibration correction mechanism, and the like.

The signs of refractive power and the radii of curvature of the surfaces of the above-described lenses are those which are considered in a paraxial region in a case where the lenses include aspheric surfaces. All of the above-described conditional expressions are for d-line (wavelength of 587.56 nm).

According to the invention, in a lens system having a four-lens configuration, in which the arrangement of refractive power is positive, negative, positive, and positive in order from the object side, since it is configured such that the predetermined conditional expressions are satisfied, it is possible to provide an imaging lens having an angle of view suitable for use in driver monitoring and having satisfactory performance in a region of visible light to near infrared light, and an imaging apparatus including the imaging lens.

DESCRIPTION OF THE PREFERRED EMBODIMENTS

Figure 1:
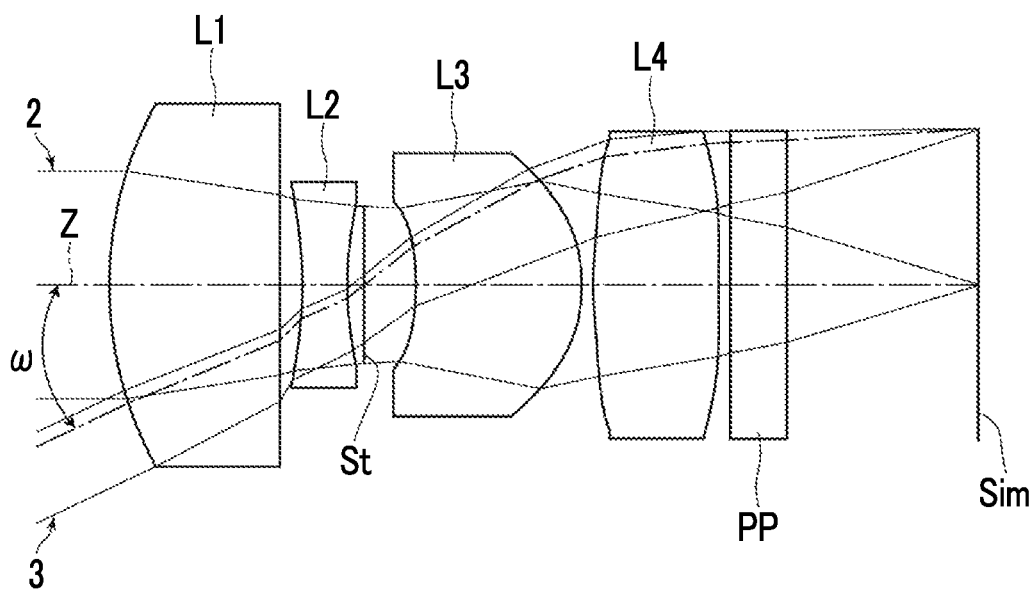
FIG. 1 is a sectional view showing the configuration and optical paths of an imaging lens of Example 1 of the invention.

Hereinafter, an embodiment of the invention will be described in detail referring to the drawings. FIG. 1 is a sectional view showing the configuration and optical paths of an imaging lens according to an embodiment of the invention. A configuration example shown in FIG. 1 corresponds to an imaging lens according to Example 1 of the invention described below. In FIG. 1, the left side is an object side, and the right side is an image side. The optical paths are for an axial light beam 2 and an off-axial light beam 3 at a maximum angle of view. A half value (maximum half angle of view) ω of the maximum full angle of view is also shown.

The imaging lens includes, in order from the object side toward the image side along an optical axis Z, a first lens L1 having positive refractive power, a second lens L2 having negative refractive power, a third lens L3 having positive refractive power, and a fourth lens L4 having positive refractive power.

In the example of FIG. 1, a parallel flat plate-shaped optical member PP is disposed between the lens system and an image plane Sim. The optical member PP assumes various filters and/or a cover glass. In the invention, the optical member PP may be disposed at a position different from that in the example of FIG. 1, or a configuration in which the optical member PP is omitted may be made.

In the example of FIG. 1, an aperture stop St is disposed between the second lens L2 and the third lens L3. The aperture stop St shown in FIG. 1 does not necessarily represent the size or shape thereof, and indicates a position on the optical axis Z. The aperture stop St may be disposed at a position different from that in the example of FIG. 1.

The imaging lens is configured such that all of the following conditional expressions (1) to (4) are satisfied.

$$0.4 < f/f234 < 2 \quad (1)$$

$$vd1 < 50 \quad (2)$$

$$5 < vd1 - vd2 < 26 \quad (3)$$

$$-5 < (R1+R2)/(R1-R2) < -0.9 \quad (4)$$

where
f: a focal length of an entire system
f234: a combined focal length of the second lens, the third lens, and the fourth lens
vd1: an Abbe number for d-line of the first lens
vd2: an Abbe number for d-line of the second lens
R1: a radius of curvature of a surface of the first lens on the object side
R2: a radius of curvature of a surface of the first lens on the image side.

The imaging lens is configured such that the value of f/f234 is not equal to or less than a lower limit defined in the conditional expression (1), whereby it becomes easy to reduce an angle of principal rays at a peripheral angle of view incident on the image plane Sim. The imaging lens is configured such that the value of f/f234 is not equal to or greater than an upper limit defined in the conditional expression (1), whereby it becomes advantageous for reduction in the total length of the lens system.

In order to increase the effect relating to the conditional expression (1), it is preferable that the following conditional expression (1-1) is satisfied.

$$0.55 < f/f234 < 1.45 \quad (1-1)$$

The imaging lens is configured such that the value of vd1 is not equal to or greater than an upper limit defined in the conditional expression (2), whereby it becomes easy to take the balance of lateral chromatic aberration and axial chromatic aberration, and it becomes advantageous to realize satisfactory performance in a region of visible light to near infrared light. When adjusting the angle of the principal rays at the peripheral angle of view incident on the image plane Sim, it becomes easy to correct lateral chromatic aberration relating to blue light being likely to be corrected insufficiently. In addition, it is preferable that the following conditional expression (2-1) is satisfied. The conditional expression (2-1) is satisfied, whereby it becomes easy to correct lateral chromatic aberration and axial chromatic aberration with satisfactory balance.

$$25 < vd1 < 50 \quad (2-1)$$

The imaging lens is configured such that the value of vd1−vd2 is not equal to or less than a lower limit defined in the conditional expression (3), whereby it becomes easy to satisfactorily correct axial chromatic aberration. The imaging lens is configured such that the value of vd1−vd2 is not equal to or greater than an upper limit defined in the conditional expression (3), whereby it becomes easy to satisfactorily correct lateral chromatic aberration. The conditional expression (3) is satisfied, whereby it becomes advantageous to realize satisfactory performance in the region of visible light to near infrared light.

The imaging lens is configured such that the value of (R1+R2)/(R1−R2) is not equal to or less than a lower limit defined in the conditional expression (4), whereby it becomes easy to suppress the occurrence of spherical aberration. The imaging lens is configured such that the value of (R1+R2)/(R1−R2) is not equal to or greater than an upper limit defined in the conditional expression (4), whereby it becomes advantageous for reduction in the total length of the lens system.

In the imaging lens, it is preferable that at least one or an arbitrary combination of the following conditional expressions (5) to (9) is satisfied;

$$0.2 < D1/f \quad (5)$$

$$27 < (vd3+vd4)/2 - vd2 < 34 \quad (6)$$

$$-30 < vd1 - (vd3+vd4)/2 < -3 \quad (7)$$

$$-2.5 < (R8+R9)/(R8-R9) < -0.5 \quad (8)$$

$$40° < 2\omega < 60° \quad (9)$$

where
D1: a thickness of the first lens on an optical axis
f: the focal length of the entire system
vd3: an Abbe number for d-line of the third lens
vd4: an Abbe number for d-line of the fourth lens
vd2: the Abbe number for d-line of the second lens
vd1: the Abbe number for d-line of the first lens
R8: a radius of curvature of a surface of the fourth lens on the object side
R9: a radius of curvature of a surface of the fourth lens on the image side
2ω: a maximum full angle of view, the unit of which is degree (°).

The imaging lens is configured such that the value of D1/f is not equal to or less than a lower limit defined in the conditional expression (5), whereby it is possible to increase the strength of the first lens L1, and damage or the like due to in-vehicle vibration hardly occurs. It is preferable that the following conditional expression (5-1) is satisfied. The imaging lens is configured such that the value of D1/f is not equal to or greater than an upper limit defined in the conditional expression (5-1), whereby it is possible to suppress an excessive increase in thickness of the first lens L1, and to achieve reduction in the total length of the lens system.

$$0.2 < D1/f < 0.6 \quad (5\text{-}1)$$

The imaging lens is configured such that the value of (vd3+vd4)/2−vd2 is not equal to or less than a lower limit defined in the conditional expression (6), whereby it becomes easy to satisfactorily correct axial chromatic aberration. The imaging lens is configured such that the value of (vd3+vd4)/2−vd2 is not equal to or greater than an upper limit defined in the conditional expression (6), whereby it becomes easy to satisfactorily correct lateral chromatic aberration.

The imaging lens is configured such that the value of vd1−(vd3+vd4)/2 is not equal to or less than a lower limit defined in the conditional expression (7), whereby it becomes easy to satisfactorily correct axial chromatic aberration. The imaging lens is configured such that the value of vd1−(vd3+vd4)/2 is not equal to or greater than an upper limit defined in the conditional expression (7), whereby it becomes easy to satisfactorily correct lateral chromatic aberration.

The imaging lens is configured such that the value of (R8+R9)/(R8−R9) is not equal to or less than a lower limit defined in the conditional expression (8), whereby it becomes easy to reduce the angle of the principal rays at the peripheral angle of view incident on the image plane Sim. The imaging lens is configured such that the value of (R8+R9)/(R8−R9) is not equal to or greater than an upper limit defined in the conditional expression (8), whereby it becomes easy to suppress the occurrence of astigmatism.

The imaging lens is configured such that the value of 2ω is not equal to or less than a lower limit defined in the conditional expression (9), whereby, for use in driver monitoring, even if the sitting position of the driver is deviated, a possibility that the eyelids and eyeballs of the driver are out of an imaging visual field is lowered. The imaging lens is configured such that the value of 2ω is not equal to or greater than an upper limit defined in the conditional expression (9), whereby, for use in driver monitoring, it is possible to allocate an appropriate number of pixels to a region of an imaging element corresponding to the eyelids and the eyeballs, and to perform analysis of a captured image by software with high accuracy.

Each lens can take, for example, the following configuration. The first lens L1 can be a plano-convex lens having a convex surface toward the object side or a biconvex lens. The second lens L2 can be a biconcave lens. The third lens L3 can be a positive meniscus lens having a convex surface toward the image side or a biconvex lens. The fourth lens L4 can be a positive lens having a convex surface toward the object side. However, the first lens L1 to the fourth lens L4 may have shapes different from the above-described shapes.

Arbitrary combinations of the preferred configuration and possible configurations described above are possible, and it is preferable that these combinations are appropriately selectively employed according to required specifications. According to this embodiment, it is possible to realize an imaging lens having an angle of view suitable for use in driver monitoring and having satisfactory performance in the region of visible light to near infrared light. The angle of view suitable for use in driver monitoring used herein is an angle of view in a range of 40°<2ω<60° when the maximum full angle of view is 2ω. Visible light used herein assumes light having a wavelength of 400 to 700 nm, and near infrared light assumes light having a wavelength of 700 nm to 1100 nm where nm represents nanometer.

Next, examples of numerical values of the imaging lens of the invention will be described.

Example 1

The lens configuration and optical paths of an imaging lens of Example 1 are as shown in FIG. 1, and since the manner in which the drawings are illustrated and the configuration are as described as the example shown in FIG. 1, overlapping description will be omitted.

Basic lens data of the imaging lens of Example 1 is shown in Table 1, and aspheric coefficients are shown in Table 2. In Table 1, the column "Si" shows an i-th (where i=1, 2, 3, . . . ) surface number in a case where a surface number is given to each surface of each component in a sequentially increasing manner toward the image side with the surface on the object side of the component on the most object side designated as first, the column "Ri" shows the radius of curvature of the i-th surface, and the column "Di" shows the surface distance between the i-th surface and an (i+1)th surface on the optical axis Z. In Table 1, the column "Ndj" shows a refractive index with respect to d-line (wavelength of 587.56 nm) of a j-th (where j=1, 2, 3, . . . ) component in a sequentially increasing manner toward the image side with the component on the most object side designated as first, and the column "vdj" shows an Abbe number for d-line of the j-th component.

The sign of the radius of curvature is positive in a case where the surface shape is a convex shape toward the object side, and is negative in a case where the surface shape is a convex surface toward the image side. Table 1 also shows the aperture stop St and the optical member PP. In Table 1, the surface number and text reading (St) are described in the column of the surface number of corresponding to the aperture stop St. The value in the lowermost column of Di is the distance between the surface on the most image side in the table and the image plane Sim. Above the frame of Table 1, the focal length f of the entire system, an F-Number FNo., and the maximum full angle of view 2ω for d-line are shown.

In Table 1, an asterisk mark * is attached to the surface number of each aspheric surface, and a numerical value of a paraxial radius of curvature is described in the column of the radius of curvature of the aspheric surface. Table 2 shows the aspheric coefficients of the respective aspheric surfaces of Example 1. "E±n" (where n: integer) in the numerical values of the aspheric coefficients of Table 2 means "×10$^{\pm N}$". The aspheric coefficients are the values of respective coefficients KA and Am (where m is an integer equal to or greater than three and is different for each surface) in an expression of aspheric surface represented by the following expression.

$$Zd = \frac{C \times h^2}{1 + \sqrt{1 - KA \times C^2 \times h^2}} + \sum_m Am \times h^m$$

where

Zd: a depth of the aspheric surface (a length of a vertical line from a point on the aspheric surface at a height h to a plane perpendicular to the optical axis in contact with the apex of the aspheric surface)

h: a height (a distance from the optical axis to the lens surface)

C: a paraxial curvature

KA, Am: aspheric coefficients

In data of the respective tables, degree (°) is used as the unit of angle and millimeter (mm) is used as the unit of length, but other appropriate units may also be used since optical systems are usable even if the optical systems are proportionally enlarged or proportionally reduced. In the respective tables described below, numerical values rounded at predetermined digits are described.

TABLE 1

EXAMPLE 1
$f = 6.84$, FNo. $= 1.80$, $2\omega = 50.4°$

| Si | Ri | Di | Ndj | νdj |
|---|---|---|---|---|
| 1 | 6.3169 | 3.0000 | 1.90366 | 31.31 |
| 2 | ∞ | 0.4000 | | |
| *3 | −6.3866 | 0.8000 | 1.63360 | 23.61 |
| *4 | 5.4929 | 0.3000 | | |
| 5 (St) | ∞ | 0.9065 | | |
| *6 | −5.5017 | 2.9199 | 1.53114 | 55.44 |
| *7 | −4.2649 | 0.2000 | | |
| *8 | 3.6523 | 2.2142 | 1.53114 | 55.44 |
| *9 | 90.2352 | 0.2000 | | |
| 10 | ∞ | 1.0000 | 1.51680 | 64.20 |
| 11 | ∞ | 3.2948 | | |

TABLE 2

EXAMPLE 1

| | SURFACE NUMBER | | | |
|---|---|---|---|---|
| | 3 | 4 | 6 | 7 |
| KA | 0.0000000E+00 | 0.0000000E−00 | 0.0000000E+00 | 0.0000000E+00 |
| A3 | 2.2741981E−03 | 6.5757158E−05 | −2.1122153E−02 | −9.2976520E−02 |
| A4 | 1.3529127E−03 | −8.0371806E−03 | 6.5023701E−03 | 1.4530721E−02 |
| A5 | 1.8968717E−03 | 1.9659554E−02 | −4.0916350E−02 | −1.6416865E−02 |
| A6 | −2.9727994E−04 | −3.2036128E−02 | 2.1028588E−02 | 2.7592658E−02 |
| A7 | −8.6087094E−05 | 2.1412623E−02 | −1.0341542E−02 | −1.3965157E−02 |
| A8 | −1.1924552E−05 | −5.4945243E−03 | 1.8427885E−03 | 2.2653385E−03 |

| | SURFACE NUMBER | |
|---|---|---|
| | 8 | 9 |
| KA | 1.1600226E+00 | −2.4489299E+05 |
| A3 | −5.2560244E−02 | 3.3690209E−02 |
| A4 | −7.9463858E−02 | −5.5379346E−02 |
| A5 | 7.9171266E−02 | 2.1919553E−02 |
| A6 | −2.4814021E−02 | −3.5587120E−03 |
| A7 | 1.4021307E−03 | 1.9800747E−04 |
| A8 | 5.2335985E−04 | −5.3999273E−06 |
| A9 | 2.2900843E−05 | −8.1435493E−06 |
| A10 | −2.2441923E−05 | 1.9377142E−06 |
| A11 | −1.7983924E−07 | 1.0583760E−06 |

Figure 16:
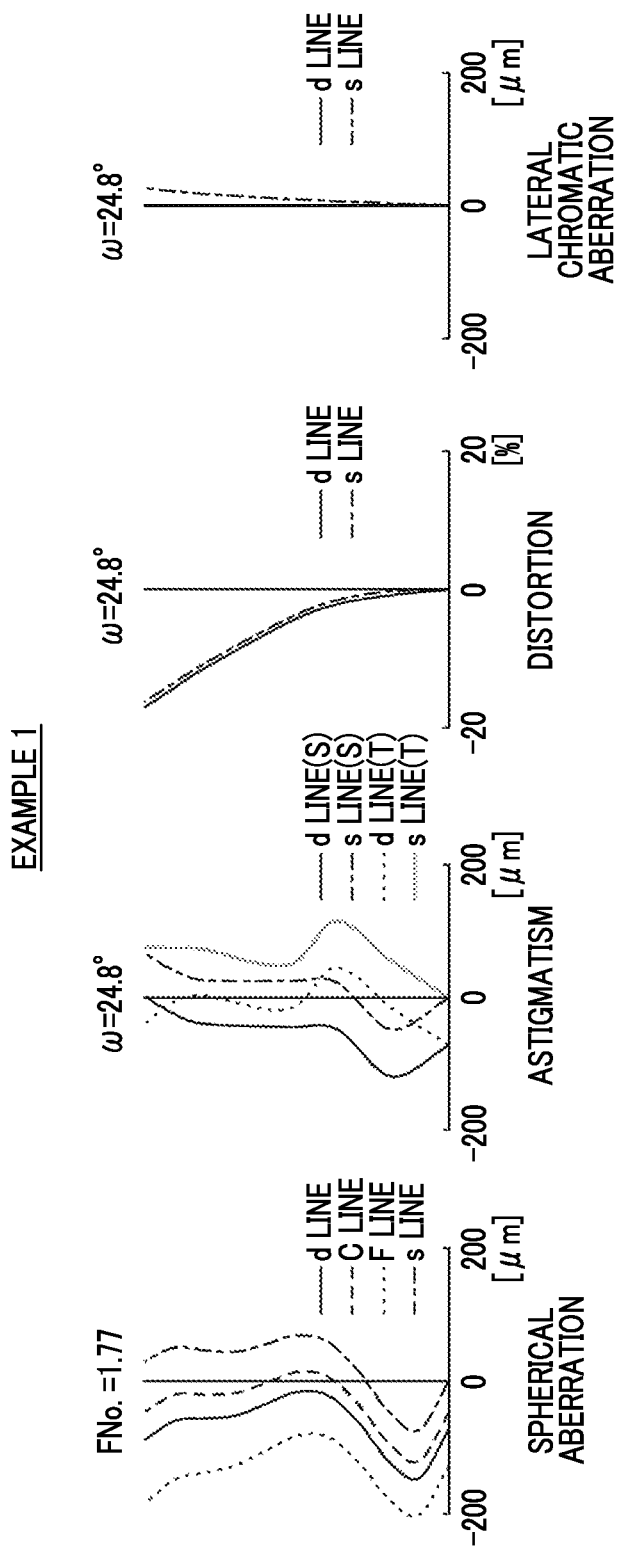
FIG. 16 shows a spherical aberration diagram, an astigmatism diagram, a distortion diagram, and a lateral chromatic aberration diagram of the imaging lens of Example 1 of the invention.

FIG. 16 shows respective aberration diagrams in a state where the imaging lens of Example 1 is focused on an object at infinity. FIG. 16 shows spherical aberration, astigmatism, distortion, and lateral chromatic aberration (chromatic aberration of magnification) in order from the left side. In the spherical aberration diagram, aberrations relating to d-line (wavelength of 587.56 nm), C-line (wavelength of 656.27 nm), F-line (wavelength of 486.13 nm), and s-line (wavelength of 852.11 nm) are respectively indicated by a solid line, a long broken line, a short broken line, and a one-dot-chain line. In the astigmatism diagram, aberrations relating to d-line in a sagittal direction (d-line (S)) and a tangential direction (d-line (T)) are respectively indicated by a black solid line and a short broken line, and aberrations relating to s-line in the sagittal direction (s-line (S)) and the tangential direction (s-line (T)) are respectively indicated by a one-dot-chain line and a gray solid line. In the distortion diagram, aberrations relating to d-line and s-line are respectively indicated by a solid line and a one-dot-chain line. In the lateral chromatic aberration diagram, aberrations relating to d-line and s-line are respectively by a solid line and a one-dot-chain line. In the spherical aberration diagram, FNo. means the F-Number, and in other aberration diagrams, ω means a half angle of view.

The symbols, the meanings, and the description methods used in the description of Example 1 described above will apply to the following examples unless otherwise specifically described, and thus, overlapping description will be omitted in the following description.

Example 2

Figure 2:
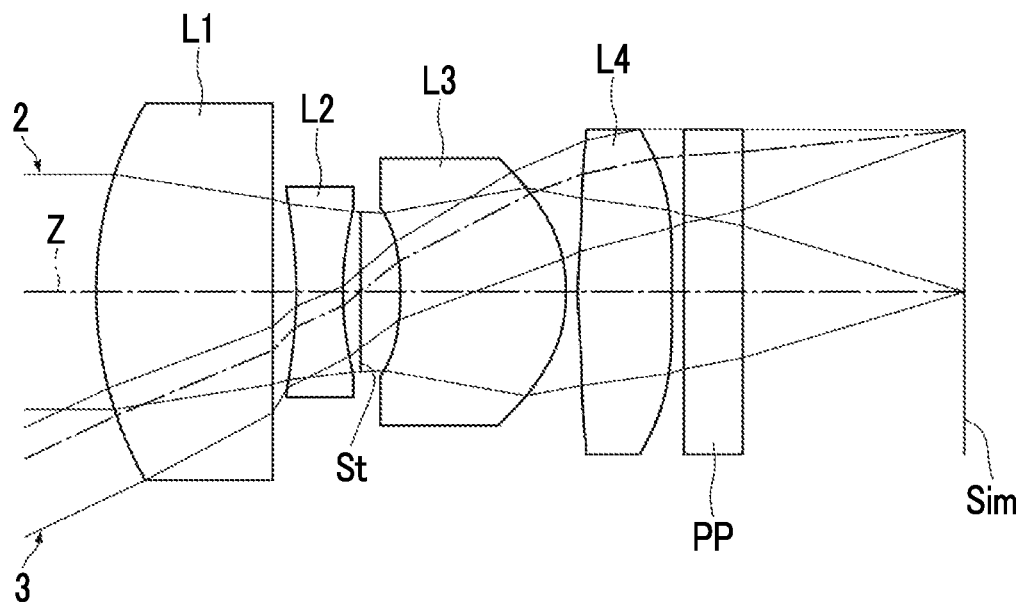
FIG. 2 is a sectional view showing the configuration and optical paths of an imaging lens of Example 2 of the invention.
Figure 17:
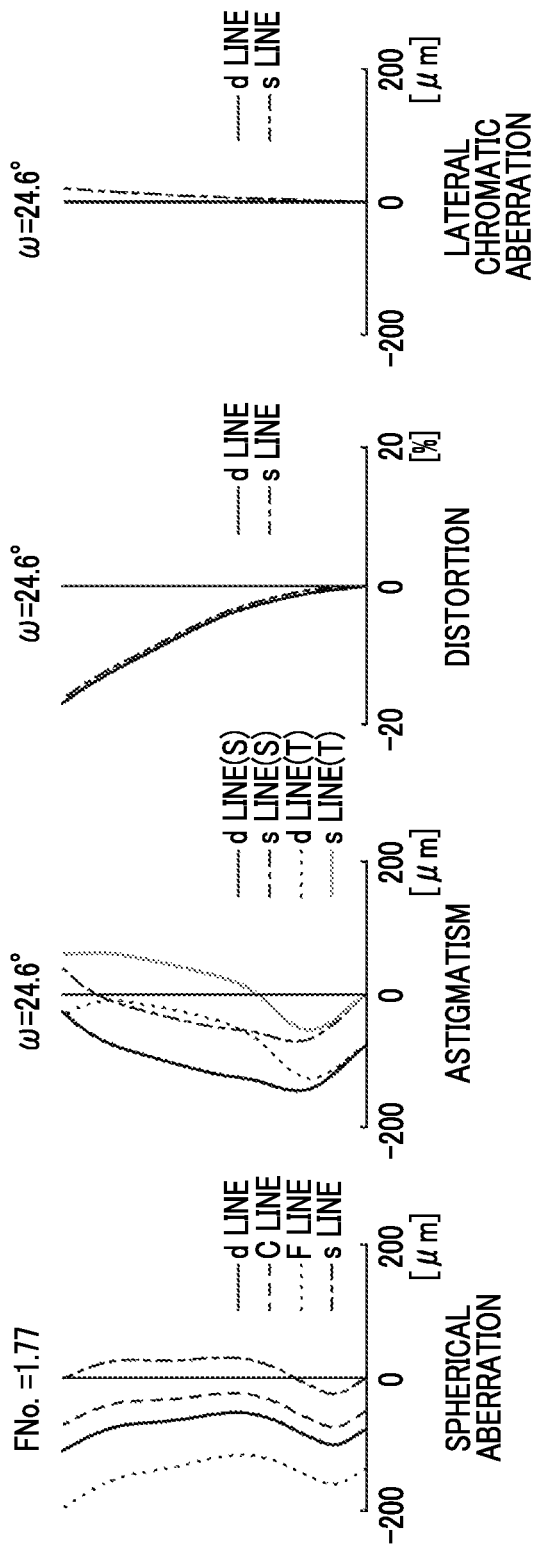
FIG. 17 shows a spherical aberration diagram, an astigmatism diagram, a distortion diagram, and a lateral chromatic aberration diagram of the imaging lens of Example 2 of the invention.

FIG. 2 is a sectional view showing the lens configuration and optical paths of an imaging lens of Example 2. Table 3 shows basic lens data of the imaging lens of Example 2, Table 4 shows aspheric coefficients, and FIG. 17 shows respective aberration diagrams in a state of being focused on an object at infinity.

TABLE 3

EXAMPLE 2
$f = 6.89$, FNo. $= 1.80$, $2\omega = 50.0°$

| Si | Ri | Di | Ndj | νdj |
|---|---|---|---|---|
| 1 | 6.2189 | 3.0000 | 1.90366 | 31.31 |
| 2 | ∞ | 0.4000 | | |
| *3 | −6.8992 | 0.8000 | 1.63360 | 23.61 |
| *4 | 5.1154 | 0.3000 | | |
| 5 (St) | ∞ | 0.6784 | | |
| *6 | −4.9519 | 2.8119 | 1.53114 | 55.44 |
| *7 | −4.2607 | 0.2000 | | |
| *8 | 3.6119 | 1.6000 | 1.53114 | 55.44 |
| *9 | ∞ | 0.2000 | | |
| 10 | ∞ | 1.0000 | 1.51680 | 64.20 |
| 11 | ∞ | 3.6947 | | |

TABLE 4

EXAMPLE 2

SURFACE NUMBER

| | 3 | 4 | 6 | 7 |
|---|---|---|---|---|
| KA | 0.0000000E+00 | 0.0000000E+00 | 0.0000000E+00 | 0.0000000E+00 |
| A3 | 2.2741981E-03 | 2.3012820E-02 | -1.0129330E-02 | -1.1950963E-01 |
| A4 | 1.3529127E-03 | -5.3495660E-02 | 3.8950730E-03 | 3.3578462E-02 |
| A5 | 1.8968717E-03 | 6.2747126E-02 | -6.0750918E-02 | -1.1159663E-02 |
| A6 | -2.9727994E-04 | -4.6701208E-02 | 5.2383744E-02 | 2.0327067E-02 |
| A7 | -8.6087094E-05 | 1.9487573E-02 | -2.7623960E-02 | -1.2577927E-02 |
| A8 | -1.1924552E-05 | -3.9298114E-03 | 5.9093593E-03 | 2.4106217E-03 |

SURFACE NUMBER

| | 8 | 9 |
|---|---|---|
| KA | 1.1600226E+00 | -3.7014196E+05 |
| A3 | -8.3331235E-02 | 2.2410789E-02 |
| A4 | -5.2844603E-02 | -5.9370939E-02 |
| A5 | 6.8327295E-02 | 2.7320217E-02 |
| A6 | -2.3511660E-02 | -5.8523204E-03 |
| A7 | 1.4193003E-03 | 3.9001183E-04 |
| A8 | 5.2639704E-04 | 4.4304750E-05 |
| A9 | 2.3953478E-05 | -6.6061917E-06 |
| A10 | -2.2805260E-05 | -4.0295622E-07 |
| A11 | -4.8311884E-07 | 5.1459151E-07 |

Example 3

Figure 3:
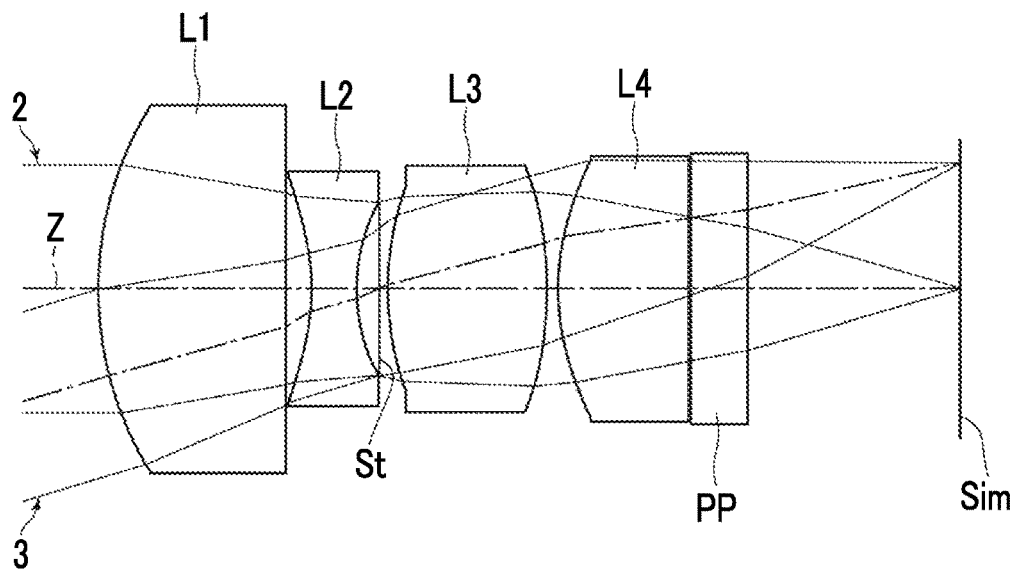
FIG. 3 is a sectional view showing the configuration and optical paths of an imaging lens of Example 3 of the invention.
Figure 18:
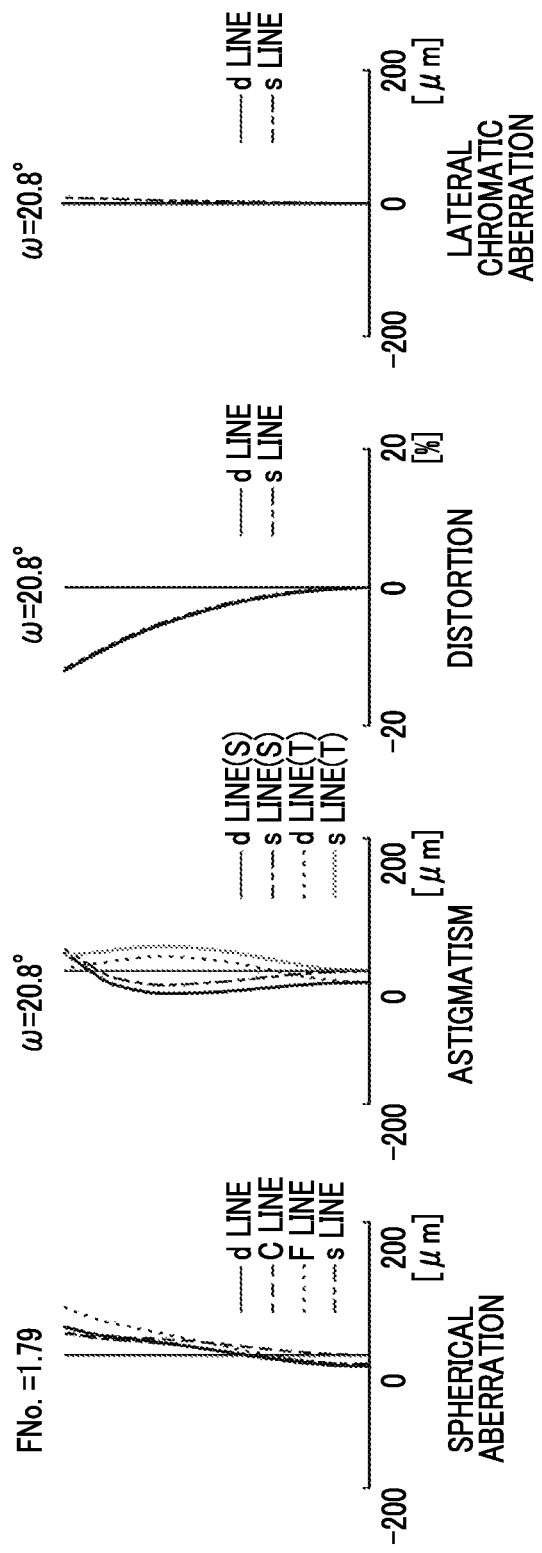
FIG. 18 shows a spherical aberration diagram, an astigmatism diagram, a distortion diagram, and a lateral chromatic aberration diagram of the imaging lens of Example 3 of the invention.

FIG. 3 is a sectional view showing the lens configuration and optical paths of an imaging lens of Example 3. Table 5 shows basic lens data of the imaging lens of Example 3, Table 6 shows aspheric coefficients, and FIG. 18 shows respective aberration diagrams in a state of being focused on an object at infinity.

TABLE 5

EXAMPLE 3
f = 7.94, FNo. = 1.80, 2ω = 42.0°

| Si | Ri | Di | Ndj | vdj |
|---|---|---|---|---|
| 1 | 6.2875 | 3.3000 | 1.90366 | 31.31 |
| 2 | ∞ | 0.4600 | | |
| *3 | -3.9756 | 0.8000 | 1.63360 | 23.61 |
| *4 | 3.3376 | 0.4000 | | |
| 5 (St) | ∞ | 0.1500 | | |
| *6 | 5.2917 | 2.8000 | 1.53114 | 55.44 |
| *7 | -7.5240 | 0.2000 | | |
| *8 | 4.2916 | 2.3000 | 1.53114 | 55.44 |
| 9 | ∞ | 0.0500 | | |
| 10 | ∞ | 1.0000 | 1.51680 | 64.20 |
| 11 | ∞ | 3.7346 | | |

TABLE 6

EXAMPLE 3

SURFACE NUMBER

| | 3 | 4 |
|---|---|---|
| KA | 1.0000000E+00 | 1.0000000E+00 |
| A3 | 0.0000000E+00 | 0.0000000E+00 |
| A4 | 9.6062352E-03 | -2.0353103E-03 |
| A5 | 0.0000000E+00 | 0.0000000E+00 |
| A6 | -2.0501260E-04 | 1.4977116E-03 |

TABLE 6-continued

EXAMPLE 3

SURFACE NUMBER

| | 6 | 7 | 8 |
|---|---|---|---|
| KA | 1.0000000E+00 | 1.0000000E+00 | 1.0000000E+00 |
| A3 | 0.0000000E+00 | 0.0000000E+00 | 0.0000000E+00 |
| A4 | -2.6173672E-03 | -1.1121173E-03 | -3.2497701E-03 |
| A5 | 0.0000000E+00 | 0.0000000E+00 | 0.0000000E+00 |
| A6 | 2.1443417E-04 | -6.6522439E-04 | |
| A7 | 0.0000000E+00 | 0.0000000E+00 | |
| A8 | 1.3274890E-04 | 8.0252536E-05 | |

Example 4

Figure 4:
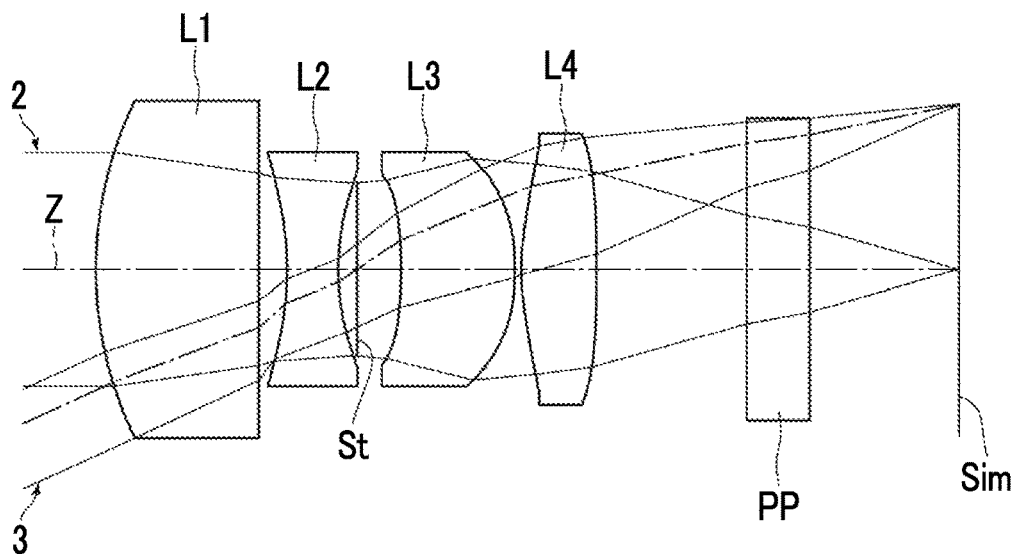
FIG. 4 is a sectional view showing the configuration and optical paths of an imaging lens of Example 4 of the invention.
Figure 19:
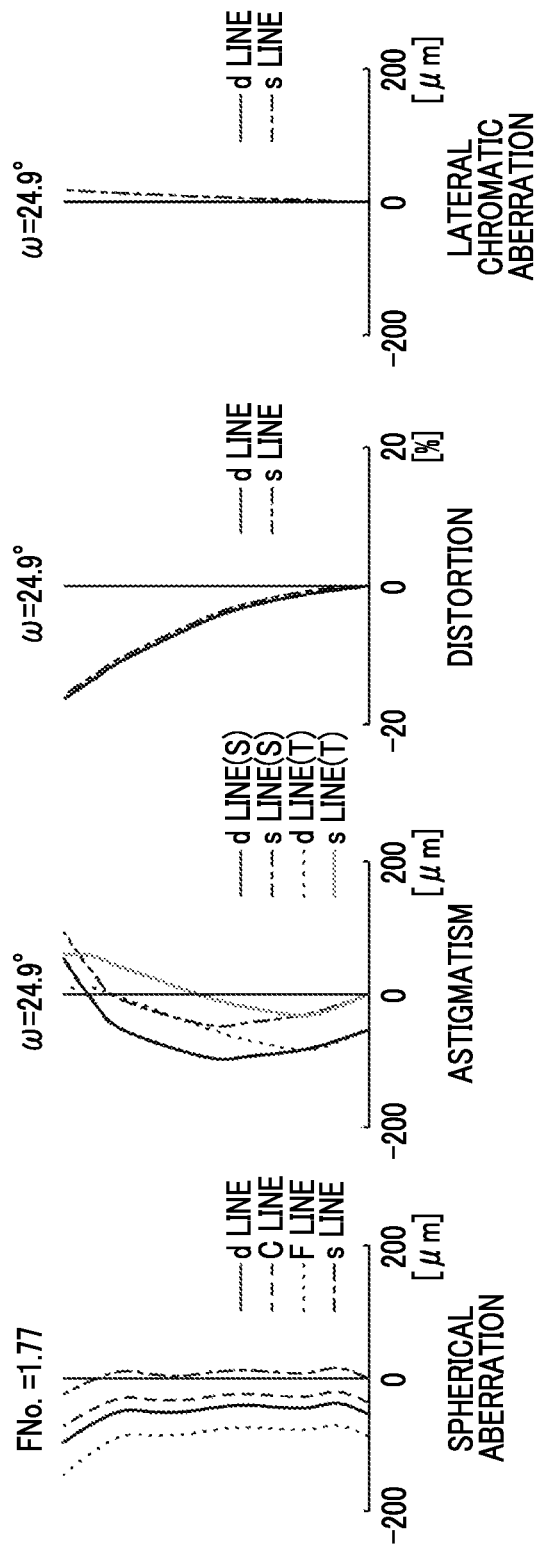
FIG. 19 shows a spherical aberration diagram, an astigmatism diagram, a distortion diagram, and a lateral chromatic aberration diagram of the imaging lens of Example 4 of the invention.

FIG. 4 is a sectional view showing the lens configuration and optical paths of an imaging lens of Example 4. Table 7 shows basic lens data of the imaging lens of Example 4, Table 8 shows aspheric coefficients, and FIG. 19 shows respective aberration diagrams in a state of being focused on an object at infinity.

TABLE 7

EXAMPLE 4
f = 6.78, FNo. = 1.80, 2ω = 50.4°

| Si | Ri | Di | Ndj | vdj |
|---|---|---|---|---|
| 1 | 6.2880 | 2.6000 | 1.90366 | 31.31 |
| 2 | ∞ | 0.4500 | | |
| *3 | -4.8799 | 0.8300 | 1.63360 | 23.61 |
| *4 | 4.2783 | 0.3000 | | |
| 5 (St) | ∞ | 0.7000 | | |
| *6 | -8.5000 | 1.8127 | 1.53114 | 55.44 |
| *7 | -6.2631 | 0.1000 | | |
| *8 | 2.9096 | 1.2114 | 1.53114 | 55.44 |
| *9 | -32.6120 | 2.4000 | | |
| 10 | ∞ | 1.0000 | 1.51680 | 64.20 |
| 11 | ∞ | 2.3369 | | |

TABLE 8

EXAMPLE 4

| | SURFACE NUMBER | |
|---|---|---|
| | 3 | 4 |
| KA | 0.0000000E+00 | 0.0000000E+00 |
| A3 | 2.2741981E-03 | 2.6606304E-02 |
| A4 | 1.3529127E-03 | -7.2569772E-02 |
| A5 | 1.8968717E-03 | 1.1887319E-01 |
| A6 | -2.9727994E-04 | -1.1252237E-01 |
| A7 | -8.6087094E-05 | 5.7943644E-02 |
| A8 | -1.924552E-05 | -1.2590385E-02 |

| | SURFACE NUMBER | | | |
|---|---|---|---|---|
| | 6 | 7 | 8 | 9 |
| KA | 0.0000000E+00 | 0.0000000E+00 | 1.1600226E+00 | 1.0000000E+00 |
| A3 | -3.0179864E-03 | -1.0135140E-01 | -8.9551280E-02 | 0.0000000E+00 |
| A4 | 3.3417701E-02 | 3.4954952E-02 | 4.4378129E-04 | -3.7473811E-03 |
| A5 | -1.2701962E-01 | -2.1418564E-02 | 2.9572726E-02 | -1.6376081E-03 |
| A6 | 1.3576726E-01 | 2.2701900E-02 | -1.7757830E-02 | 8.4881609E-05 |
| A7 | -6.6294702E-02 | -1.4245146E-02 | 2.3549737E-03 | |
| A8 | 8.1689470E-03 | 3.1177004E-03 | 2.9073776E-04 | |
| A9 | 4.4178354E-04 | 1.8329509E-05 | 5.2295361E-05 | |
| A10 | 5.9139990E-04 | 9.2408016E-06 | -1.6597990E-06 | |
| A11 | 2.6230240E-04 | -9.5310594E-06 | -1.8148950E-05 | |
| A12 | 3.1570659E-06 | -1.0313521E-05 | | |
| A13 | -3.7577069E-05 | -1.4400728E-06 | | |
| A14 | -1.1006883E-05 | -1.2707981E-06 | | |
| A15 | -3.1368581E-05 | 1.2661399E-07 | | |
| A16 | 1.6472401E-05 | -1.1979228E-08 | | |
| A17 | -1.9494613E-05 | 2.9959221E-07 | | |
| A18 | 3.3024902E-06 | 2.0489221E-08 | | |
| A19 | 3.8789834E-06 | -1.6193511E-08 | | |
| A20 | -1.6481849E-06 | -6.3189583E-09 | | |

Example 5

Figure 5:
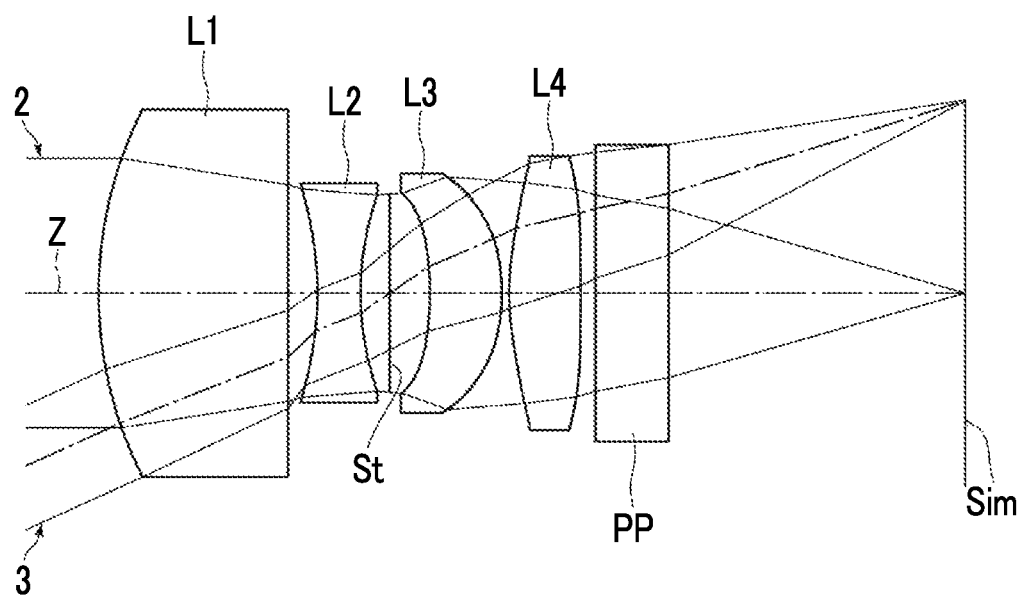
FIG. 5 is a sectional view showing the configuration and optical paths of an imaging lens of Example 5 of the invention.
Figure 20:
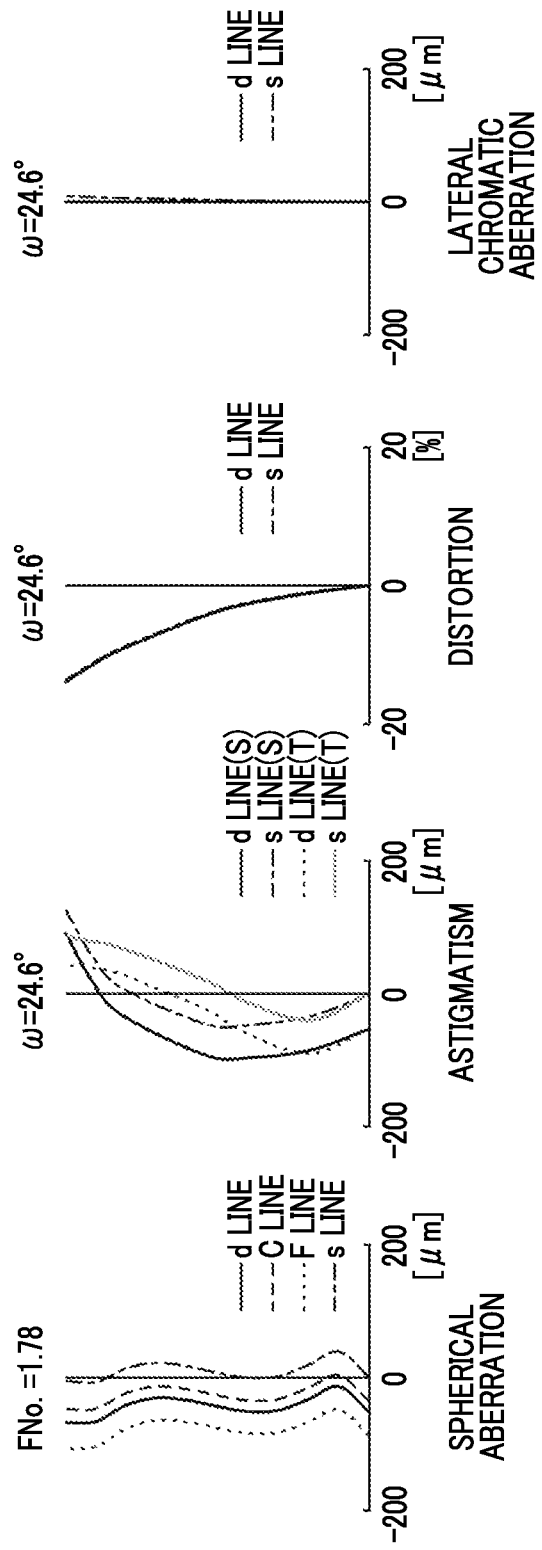
FIG. 20 shows a spherical aberration diagram, an astigmatism diagram, a distortion diagram, and a lateral chromatic aberration diagram of the imaging lens of Example 5 of the invention.

FIG. 5 is a sectional view showing the lens configuration and optical paths of an imaging lens of Example 5. Table 9 shows basic lens data of the imaging lens of Example 5, Table 10 shows aspheric coefficients, and FIG. 20 shows respective aberration diagrams in a state of being focused on an object at infinity.

TABLE 9

EXAMPLE 5
$f = 6.70$, FNo. $= 1.80$, $2\omega = 49.8°$

| Si | Ri | Di | Ndj | vdj |
|---|---|---|---|---|
| 1 | 5.7178 | 2.6000 | 1.90366 | 31.31 |
| 2 | ∞ | 0.4000 | | |

TABLE 9-continued

EXAMPLE 5
$f = 6.70$, FNo. $= 1.80$, $2\omega = 49.8°$

| Si | Ri | Di | Ndj | vdj |
|---|---|---|---|---|
| *3 | -4.5497 | 0.6000 | 1.63360 | 23.61 |
| *4 | 4.2626 | 0.4000 | | |
| 5 (St) | ∞ | 0.5500 | | |
| *6 | -5.1323 | 0.9845 | 1.53114 | 55.44 |
| *7 | -3.9711 | 0.1000 | | |
| *8 | 2.6952 | 0.9845 | 1.53114 | 55.44 |
| *9 | ∞ | 0.2000 | | |
| 10 | ∞ | 1.0000 | 1.51680 | 64.20 |
| 11 | ∞ | 4.0228 | | |

TABLE 10

EXAMPLE 5

| | SURFACE NUMBER | |
|---|---|---|
| | 3 | 4 |
| KA | 0.0000000E+00 | 0.0000000E+00 |
| A3 | 2.2741981E-03 | 2.0317518E-02 |
| A4 | 1.3529127E-03 | -5.6176171E-02 |
| A5 | 1.8968717E-03 | 1.0368302E-01 |
| A6 | -2.9727994E-04 | -1.0766475E-01 |
| A7 | -8.6087094E-05 | 5.8215157E-02 |
| A8 | -1.1924552E-05 | -1.2952933E-02 |

TABLE 10-continued

EXAMPLE 5

| | SURFACE NUMBER | | | |
|---|---|---|---|---|
| | 6 | 7 | 8 | 9 |
| KA | 0.0000000E+00 | 0.0000000E+00 | 1.1600226E+00 | −4.5739402E+06 |
| A3 | −2.8059435E−02 | −9.6227148E−02 | −9.1611838E−02 | −2.1713754E−02 |
| A4 | 7.6316425E−02 | 4.3106121E−04 | −9.0585039E−03 | 2.9394150E−02 |
| A5 | −1.6668178E−01 | 9.4335772E−03 | 3.3663072E−02 | −3.1919195E−02 |
| A6 | 1.3927356E−01 | 9.1044415E−03 | −1.7744225E−02 | 5.3639453E−03 |
| A7 | −6.6113234E−02 | −1.4764977E−02 | 2.1039139E−03 | 3.2377555E−03 |
| A8 | 8.2047902E−03 | 3.2725210E−03 | 3.3215051E−04 | −4.0406654E−05 |
| A9 | 3.3686394E−04 | 5.3705053E−05 | 6.4162667E−05 | −3.7748124E−04 |
| A10 | 4.4418626E−04 | 1.4807411E−05 | 4.7716297E−06 | −2.7536148E−04 |
| A11 | 2.0987693E−04 | −9.7801377E−06 | −1.7862674E−05 | 1.3033542E−04 |
| A12 | −1.2399261E−05 | −1.1255292E−05 | | |
| A13 | −4.2417492E−05 | −7.0888662E−06 | | |
| A14 | −3.5757876E−05 | −2.8267316E−06 | | |
| A15 | −4.3789714E−05 | −5.9104061E−07 | | |
| A16 | −2.7674809E−05 | −4.7439131E−07 | | |
| A17 | 3.2084820E−06 | 3.1717749E−08 | | |
| A18 | 4.6634626E−06 | −7.3304478E−08 | | |
| A19 | 2.1672013E−06 | −9.6322681E−09 | | |
| A20 | −1.4125527E−06 | 1.2252155E−08 | | |

Example 6

Figure 6:
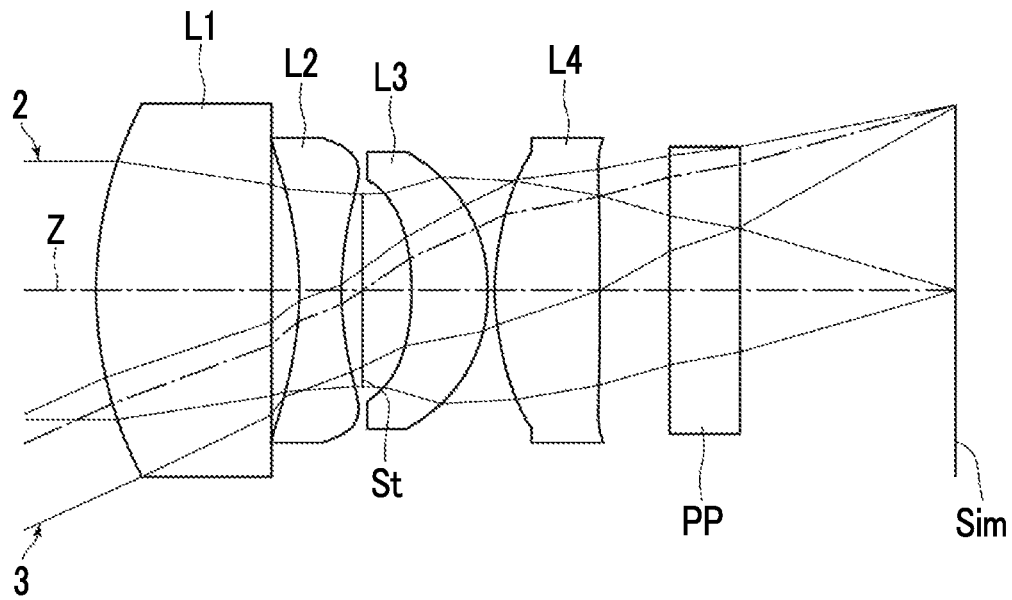
FIG. 6 is a sectional view showing the configuration and optical paths of an imaging lens of Example 6 of the invention.
Figure 21:
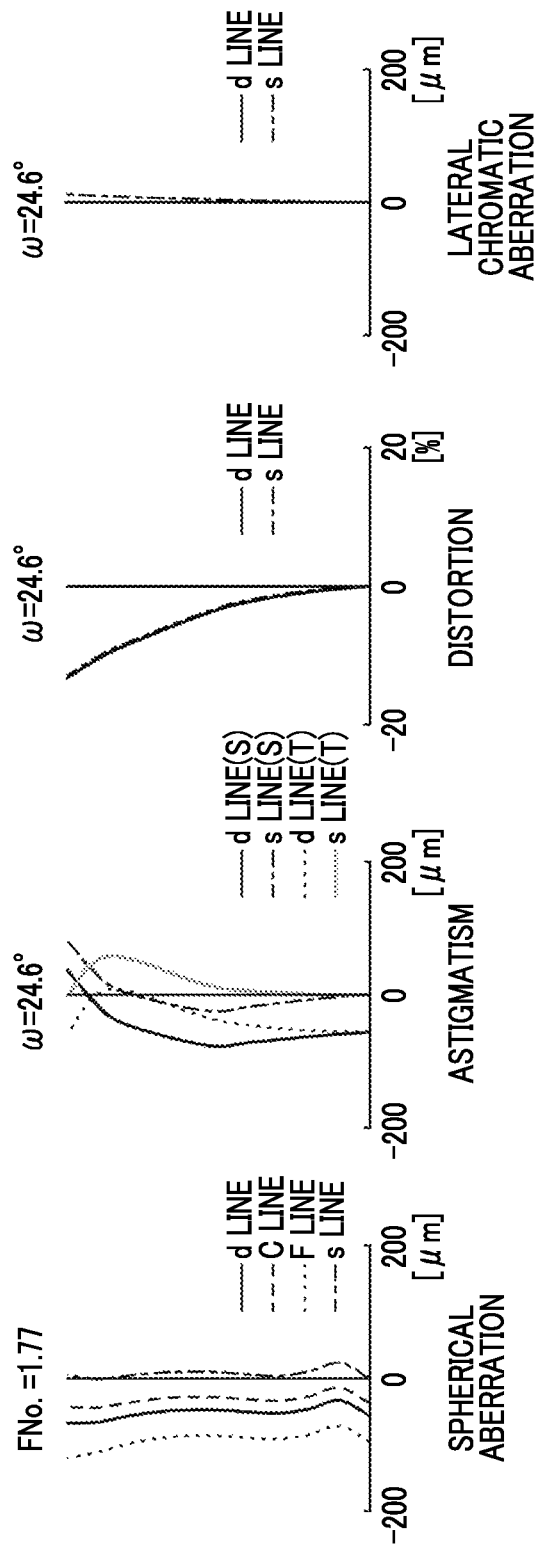
FIG. 21 shows a spherical aberration diagram, an astigmatism diagram, a distortion diagram, and a lateral chromatic aberration diagram of the imaging lens of Example 6 of the invention.

FIG. 6 is a sectional view showing the lens configuration and optical paths of an imaging lens of Example 6. Table 11 shows basic lens data of the imaging lens of Example 6, Table 12 shows aspheric coefficients, and FIG. 21 shows respective aberration diagrams in a state of being focused on an object at infinity.

TABLE 11

EXAMPLE 6
f = 6.65, FNo = 1.80, 2ω = 49.8°

| Si | Ri | Di | Ndj | vdj |
|---|---|---|---|---|
| 1 | 5.8883 | 2.5000 | 1.90366 | 31.31 |
| 2 | ∞ | 0.4000 | | |
| *3 | −4.7934 | 0.6000 | 1.63360 | 23.61 |
| *4 | 4.8842 | 0.3000 | | |
| 5 (St) | ∞ | 0.7000 | | |
| *6 | −4.0654 | 1.0847 | 1.53114 | 55.44 |
| *7 | −3.5571 | 0.1000 | | |
| *8 | 2.8428 | 1.5000 | 1.53114 | 55.44 |
| *9 | ∞ | 1.0000 | | |
| 10 | ∞ | 1.0000 | 1.51680 | 64.20 |
| 11 | ∞ | 3.0169 | | |

TABLE 12

EXAMPLE 6

| | SURFACE NUMBER | |
|---|---|---|
| | 3 | 4 |
| KA | 0.0000000E+00 | 0.0000000E+00 |
| A3 | 2.2741981E−03 | 1.0363246E−02 |
| A4 | 1.3529127E−03 | −4.2958679E−02 |
| A5 | 1.8968717E−03 | 8.9917684E−02 |
| A6 | −2.9727994E−04 | −1.0186628E−01 |
| A7 | −8.6087094E−05 | 5.8271027E−02 |
| A8 | −1.1924552E−05 | −1.3650699E−02 |

| | SURFACE NUMBER | | | |
|---|---|---|---|---|
| | 6 | 7 | 8 | 9 |
| KA | 0.0000000E+00 | 0.0000000E+00 | 1.1600226E+00 | −4.5739402E+06 |
| A3 | −2.0290643E−02 | −6.4090940E−02 | −5.5944520E−02 | −5.0522736E−03 |
| A4 | 5.6383804E−02 | −1.5552672E−02 | −3.3923999E−02 | 6.1529074E−03 |
| A5 | −1.5294028E−01 | 1.5408080E−02 | 5.6101438E−02 | −8.5663621E−03 |
| A6 | 1.3989793E−01 | 1.0484717E−02 | −2.2907571E−02 | −8.0641406E−04 |
| A7 | −6.5784090E−02 | −1.4232545E−02 | 1.4616388E−03 | 3.3777702E−03 |
| A8 | 8.6822728E−03 | 3.3420979E−03 | 4.5518817E−04 | 1.1118670E−04 |
| A9 | 6.7583597E−04 | 6.3105614E−05 | 1.1665155E−04 | −3.5923340E−04 |
| A10 | 5.9140756E−04 | 1.7407024E−05 | 1.4234879E−05 | −2.7573286E−04 |

TABLE 12-continued

| EXAMPLE 6 | | | | |
|---|---|---|---|---|
| A11 | 2.3209329E−04 | −8.6609095E−06 | −1.8514272E−05 | 1.2983771E−04 |
| A12 | −4.2331630E−05 | −1.0407157E−05 | | |
| A13 | −7.9657584E−05 | −5.6933173E−06 | | |
| A14 | −6.5361567E−05 | −2.3887663E−06 | | |
| A15 | −4.6182607E−05 | −3.1981948E−08 | | |
| A16 | −6.5316655E−06 | −2.7322915E−07 | | |
| A17 | 2.3046565E−06 | 4.2510094E−07 | | |
| A18 | 7.6475159E−06 | 1.8188022E−07 | | |
| A19 | 4.4187022E−06 | 7.1692034E−08 | | |
| A20 | −1.6771773E−06 | −5.2825637E−08 | | |

Example 7

Figure 7:
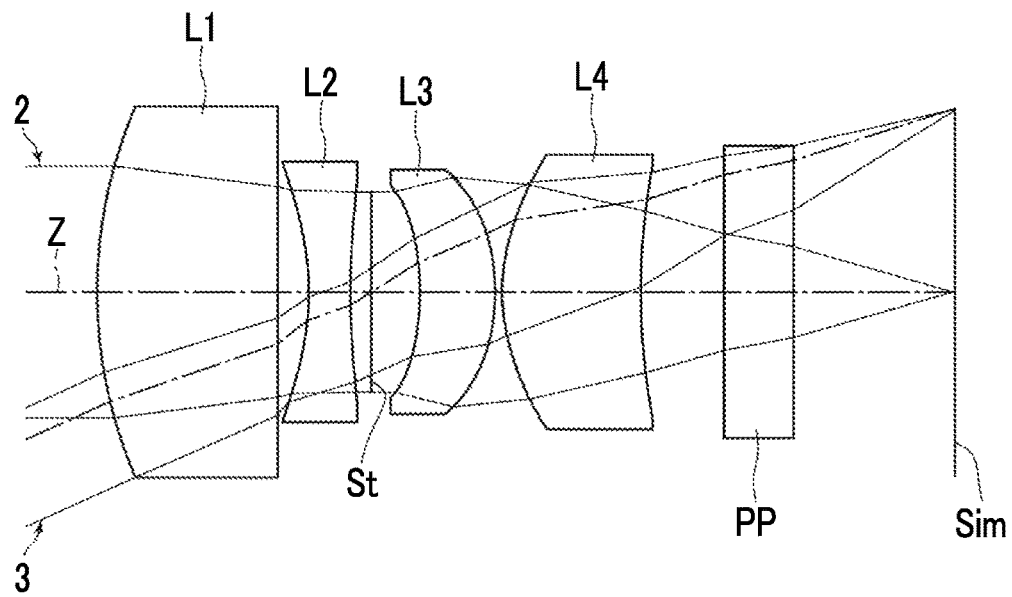
FIG. 7 is a sectional view showing the configuration and optical paths of an imaging lens of Example 7 of the invention.
Figure 22:
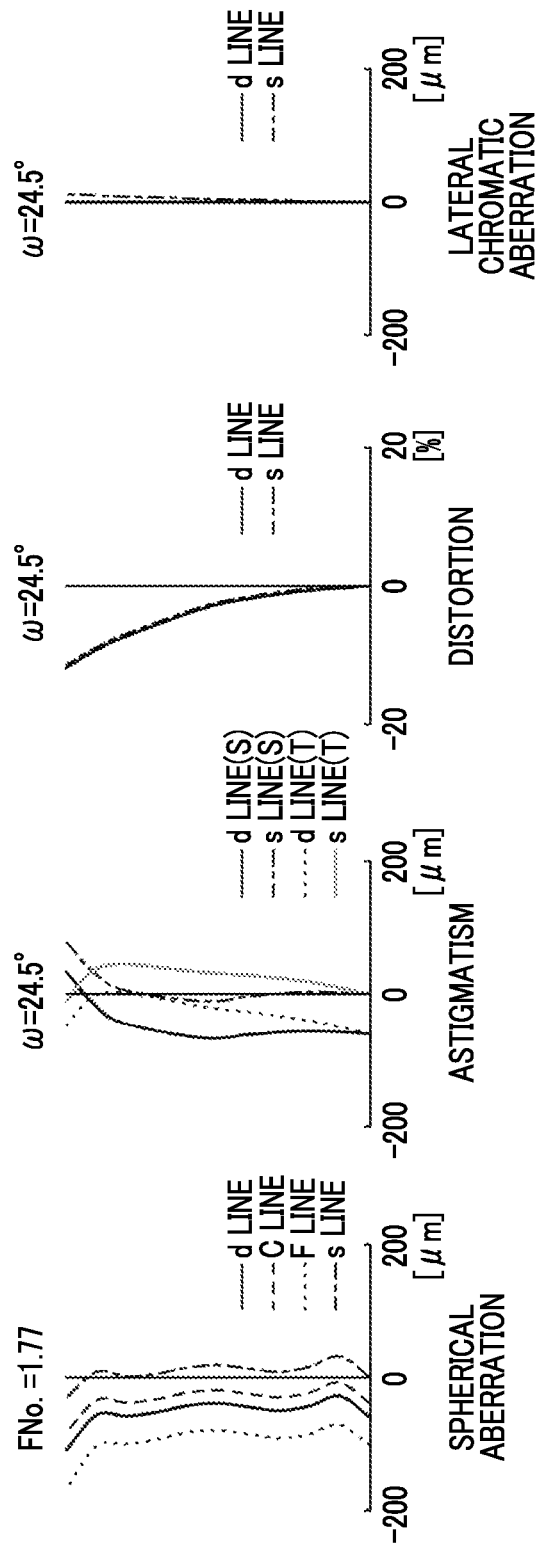
FIG. 22 shows a spherical aberration diagram, an astigmatism diagram, a distortion diagram, and a lateral chromatic aberration diagram of the imaging lens of Example 7 of the invention.

FIG. 7 is a sectional view showing the lens configuration and optical paths of an imaging lens of Example 7. Table 13 shows basic lens data of the imaging lens of Example 7, Table 14 shows aspheric coefficients, and FIG. 22 shows respective aberration diagrams in a state of being focused on an object at infinity.

TABLE 13

| EXAMPLE 7 | | | | |
|---|---|---|---|---|
| f = 6.55, FNo. = 1.80, 2ω = 49.8° | | | | |
| Si | Ri | Di | Ndj | νdj |
| 1 | 6.8992 | 2.6000 | 1.90366 | 31.31 |
| 2 | ∞ | 0.4500 | | |
| *3 | −4.0950 | 0.6000 | 1.63360 | 23.61 |
| *4 | 12.6022 | 0.3000 | | |
| 5 (St) | ∞ | 0.7000 | | |
| *6 | −4.0654 | 1.0847 | 1.53114 | 55.44 |
| *7 | −3.6105 | 0.1000 | | |
| *8 | 2.5064 | 2.0000 | 1.53114 | 55.44 |
| 9 | 10.0000 | 1.2000 | | |
| 10 | ∞ | 1.0000 | 1.51680 | 64.20 |
| 11 | ∞ | 2.2668 | | |

TABLE 14

| EXAMPLE 7 | | |
|---|---|---|
| SURFACE NUMBER | | |
| | 3 | 4 |
| KA | 0.0000000E+00 | 0.0000000E+00 |
| A3 | 2.2741981E−03 | 1.1788823E−02 |
| A4 | 1.3529127E−03 | −4.3013209E−02 |
| A5 | 1.8968717E−03 | 9.1138958E−02 |
| A6 | −2.9727994E−04 | −1.0435321E−01 |
| A7 | −8.6087094E−05 | 9.9133300E−02 |
| A8 | −1.1924552E−05 | −1.3213872E−02 |
| SURFACE NUMBER | | |
| | 6 | 7 | 8 |
| KA | 0.0000000E+00 | 0.0000000E+00 | 1.1600226E+00 |
| A3 | −1.9555749E−02 | −4.8500141E−02 | −3.8402530E−02 |
| A4 | 8.5701163E−02 | 3.1291385E−02 | −4.8136728E−03 |
| A5 | −1.6185417E−01 | −3.3960321E−02 | 1.2238879E−02 |
| A6 | 1.4003940E−01 | 2.4673729E−02 | −1.0143816E−02 |
| A7 | −6.4358583E−02 | −1.3886753E−02 | 2.1233630E−03 |
| A8 | 8.8570780E−03 | 3.1640840E−03 | 9.3678972E−05 |

TABLE 14-continued

| EXAMPLE 7 | | |
|---|---|---|
| A9 | 6.1318090E−04 | 5.3545108E−05 | 2.9948226E−05 |
| A10 | 5.6603717E−04 | 2.3893015E−05 | −1.2710845E−05 |
| A11 | 2.4612732E−04 | −7.7769833E−06 | −3.4424107E−05 |
| A12 | −1.9931076E−05 | −1.2284089E−05 | |
| A13 | −6.2606369E−05 | −7.7843494E−06 | |
| A14 | −5.7572222E−05 | −3.9625480E−06 | |
| A15 | −4.6077595E−05 | −9.3187754E−07 | |
| A16 | −4.3078517E−06 | −6.7597248E−07 | |
| A17 | 2.1750066E−07 | 2.1120618E−07 | |
| A18 | 7.8330037E−06 | 7.1466462E−08 | |
| A19 | 3.9079925E−06 | 1.7977195E−07 | |
| A20 | −2.2831005E−06 | −4.0953556E−08 | |

Example 8

Figure 8:
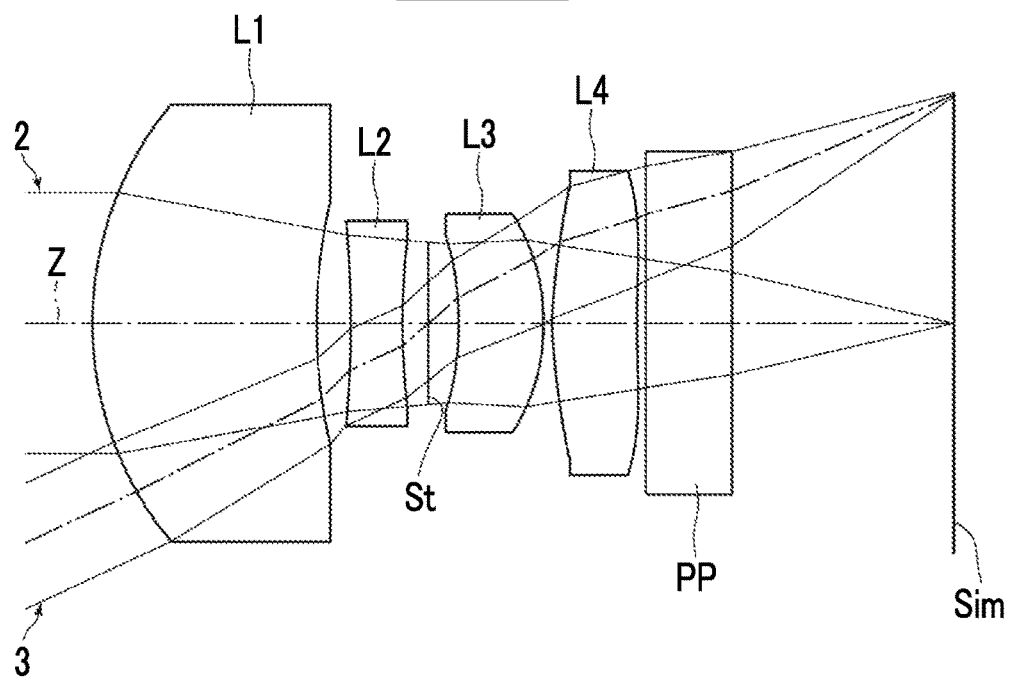
FIG. 8 is a sectional view showing the configuration and optical paths of an imaging lens of Example 8 of the invention.
Figure 23:
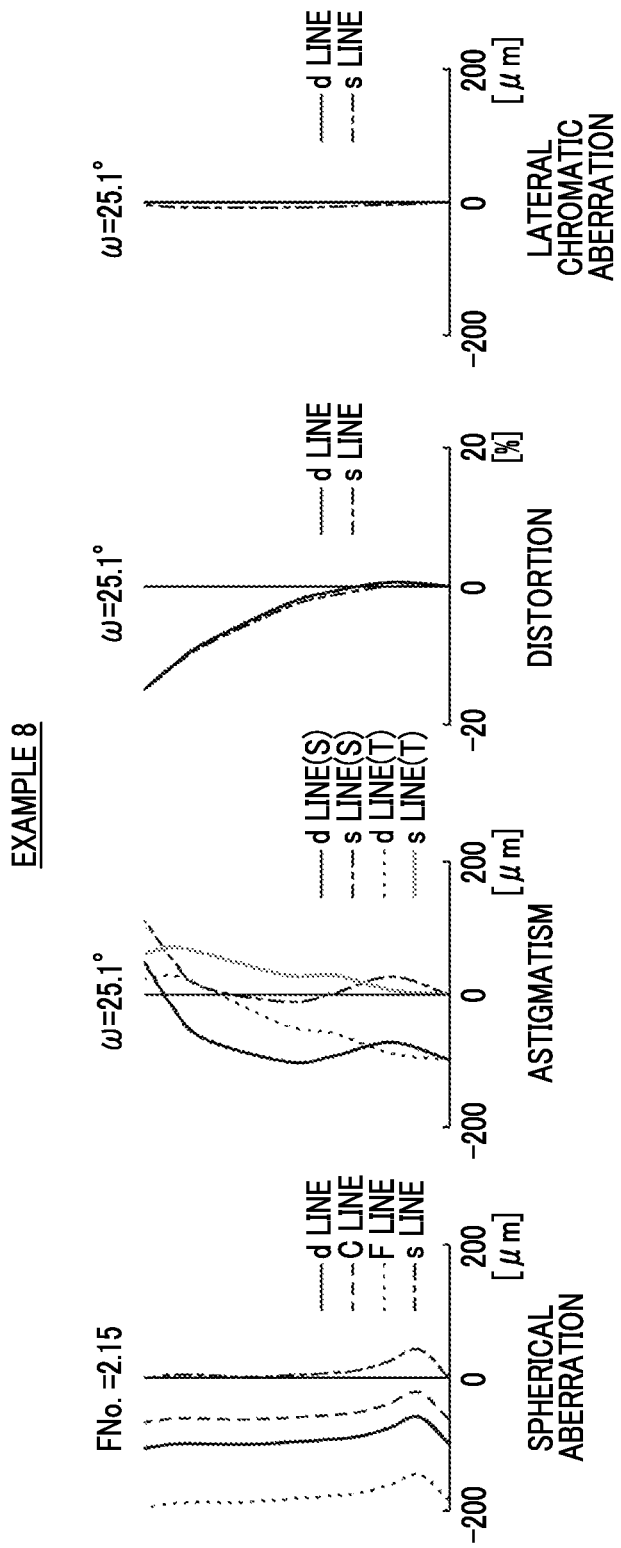
FIG. 23 shows a spherical aberration diagram, an astigmatism diagram, a distortion diagram, and a lateral chromatic aberration diagram of the imaging lens of Example 8 of the invention.

FIG. 8 is a sectional view showing the lens configuration and optical paths of an imaging lens of Example 8. Table 15 shows basic lens data of the imaging lens of Example 8, Table 16 shows aspheric coefficients, and FIG. 23 shows respective aberration diagrams in a state of being focused on an object at infinity.

TABLE 15

| EXAMPLE 8 | | | | |
|---|---|---|---|---|
| f = 6.62, FNo. = 2.20, 2ω = 51.4° | | | | |
| Si | Ri | Di | Ndj | νdj |
| 1 | 4.0654 | 2.6000 | 1.90366 | 31.31 |
| 2 | 6.2582 | 0.4000 | | |
| *3 | −12.2276 | 0.6000 | 1.63360 | 23.61 |
| *4 | 9.1950 | 0.3000 | | |
| 5 (St) | ∞ | 0.3501 | | |
| *6 | −4.0654 | 0.9845 | 1.53114 | 55.44 |
| *7 | −3.5571 | 0.1000 | | |
| *8 | 2.7802 | 0.9845 | 1.53114 | 55.44 |
| *9 | 11.1674 | 0.1000 | | |
| 10 | ∞ | 1.0000 | 1.51680 | 64.20 |
| 11 | ∞ | 2.4693 | | |

TABLE 16

EXAMPLE 8

| | SURFACE NUMBER | | | |
|---|---|---|---|---|
| | 3 | 4 | 6 | 7 |
| KA | 1.8695070E+01 | −1.2309709E+01 | 0.0000000E+00 | 0.0000000E+00 |
| A3 | 2.2741981E−03 | −6.0739510E−03 | 2.7944412E−04 | −9.3820316E−02 |
| A4 | 1.3529127E−03 | 2.8882853E−02 | 2.6649555E−02 | −2.2743719E−03 |
| A5 | 1.8968717E−03 | 1.2903369E−02 | −1.1730467E−01 | 2.3640115E−02 |
| A6 | −2.9727994E−04 | −1.0837399E−01 | 1.2670214E−01 | 1.6481327E−02 |
| A7 | −8.6087094E−05 | 1.1880894E−01 | −8.0899654E−02 | −1.5502266E−02 |
| A8 | −1.1924552E−05 | −4.1956537E−02 | 6.9096025E−03 | 1.2035957E−03 |
| A9 | −2.4545183E−04 | −3.4619014E−04 | 1.1858470E−02 | −1.0314368E−03 |
| A10 | −1.2475186E−04 | −2.3879855E−04 | 1.1111771E−02 | −1.0504400E−04 |
| A11 | −5.8858964E−05 | −2.0440682E−04 | 9.1430215E−03 | 1.3028418E−04 |
| A12 | −2.0926703E−05 | 2.2490158E−03 | −3.4822305E−03 | 2.1193123E−04 |
| A13 | −3.5933835E−06 | −8.4962480E−04 | −2.8821784E−02 | 2.4545238E−04 |
| A14 | 5.0988972E−05 | −2.7804347E−03 | 2.1090802E−02 | 1.8375402E−04 |
| A15 | −1.4833389E−04 | −2.8516694E−04 | −7.8381542E−03 | −1.9195203E−04 |
| A16 | −5.7885137E−05 | 1.7883701E−03 | 2.2478976E−03 | 1.5472907E−04 |
| A17 | 9.5788164E−05 | −1.7968101E−04 | −4.4269909E−04 | −8.2418037E−05 |
| A18 | 3.3245981E−05 | −3.5277748E−05 | 9.6828077E−04 | 1.3299131E−05 |
| A19 | −1.7146320E−05 | −4.7909828E−05 | 4.4083575E−04 | 4.5850260E−06 |
| A20 | 4.5538580E−06 | 3.2995507E−05 | −4.1828232E−04 | −8.3941673E−06 |

| | SURFACE NUMBER | |
|---|---|---|
| | 8 | 9 |
| KA | 2.0614417E−01 | −5.7644549E+03 |
| A3 | −1.1513875E−01 | 7.1483837E−02 |
| A4 | 8.5393628E−03 | −1.0210789E−01 |
| A5 | 3.8506540E−02 | 3.5879472E−02 |
| A6 | −1.9012334E−02 | −3.1610068E−03 |
| A7 | 1.7151986E−03 | −9.6044759E−04 |
| A8 | 1.9548192E−04 | −7.9025460E−05 |
| A9 | 4.3998188E−05 | 2.3176640E−05 |
| A10 | 2.5406699E−05 | 1.6839075E−05 |
| A11 | 1.0324973E−05 | 8.0574360E−06 |
| A12 | 4.5544663E−07 | 7.0133348E−07 |
| A13 | 2.1869788E−07 | −1.0654495E−07 |
| A14 | 5.9124367E−08 | −2.3286726E−07 |
| A15 | 2.2318569E−08 | −1.7763933E−07 |
| A16 | 2.5422997E−06 | −1.9584231E−06 |
| A17 | 4.1053268E−07 | 7.8007801E−09 |
| A18 | 3.0189538E−07 | 5.4483969E−07 |
| A19 | −8.1565031E−07 | 4.0231023E−07 |
| A20 | 1.5374776E−07 | −1.7281335E−07 |

Example 9

Figure 9:
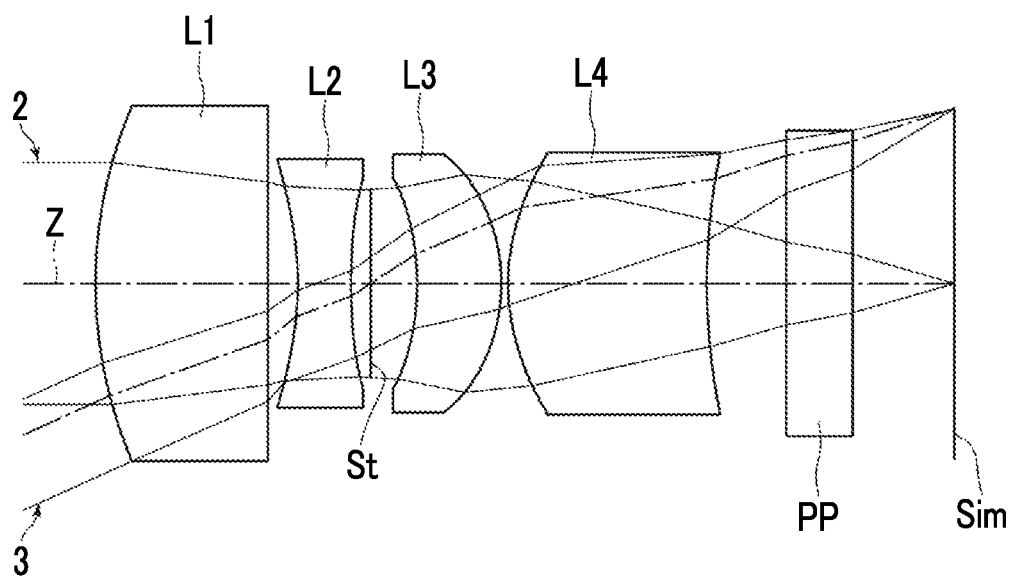
FIG. 9 is a sectional view showing the configuration and optical paths of an imaging lens of Example 9 of the invention.
Figure 24:
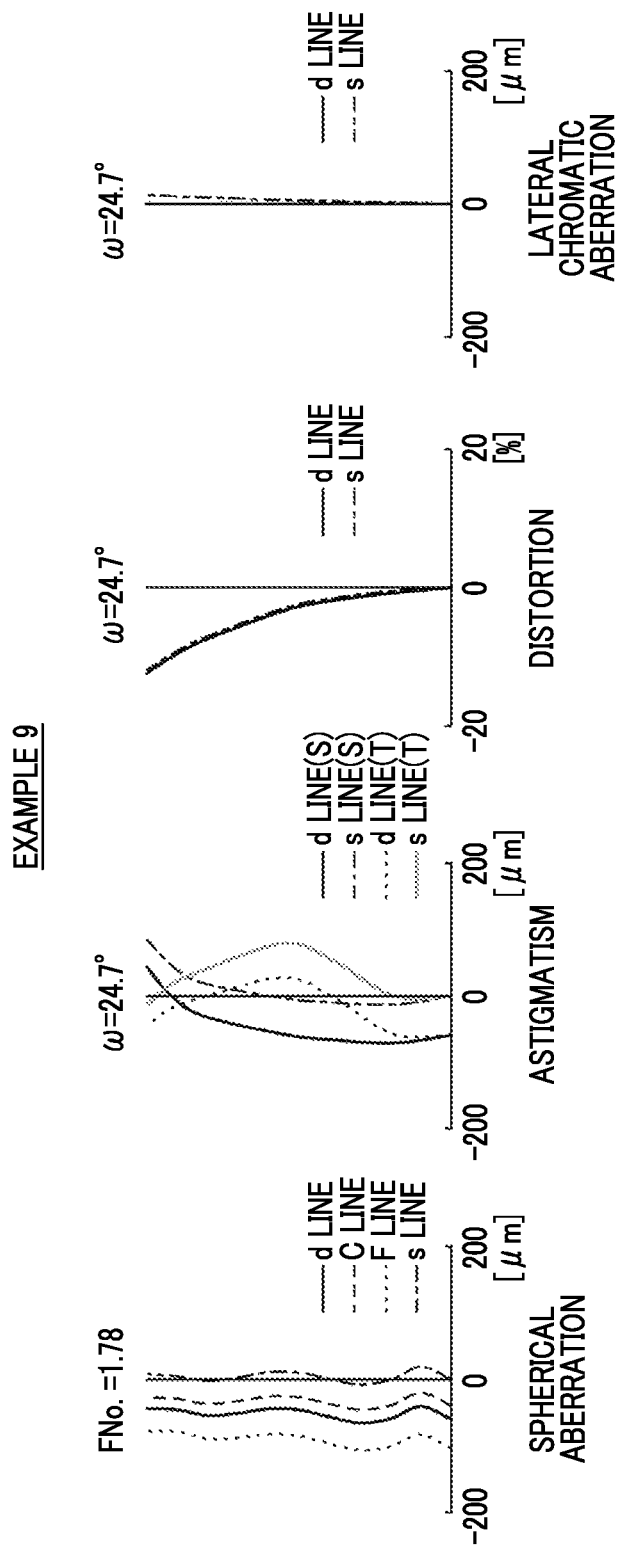
FIG. 24 shows a spherical aberration diagram, an astigmatism diagram, a distortion diagram, and a lateral chromatic aberration diagram of the imaging lens of Example 9 of the invention.

FIG. 9 is a sectional view showing the lens configuration and optical paths of an imaging lens of Example 9. Table 17 shows basic lens data of the imaging lens of Example 9, Table 18 shows aspheric coefficients, and FIG. 24 shows respective aberration diagrams in a state of being focused on an object at infinity.

TABLE 17

EXAMPLE 9
f = 6.53, FNo. = 1.80, 2ω = 50.2°

| Si | Ri | Di | Ndj | vdj |
|---|---|---|---|---|
| 1 | 6.9457 | 2.6000 | 1.90366 | 31.31 |
| 2 | ∞ | 0.4500 | | |
| *3 | −4.9267 | 0.8000 | 1.63360 | 23.61 |
| *4 | 9.5363 | 0.3000 | | |
| 5 (St) | ∞ | 0.7000 | | |
| *6 | −4.0654 | 1.2667 | 1.53114 | 55.44 |
| *7 | −3.6033 | 0.1000 | | |
| *8 | 2.6831 | 3.0000 | 1.53114 | 55.44 |
| 9 | 10.0000 | 1.2000 | | |

TABLE 17-continued

EXAMPLE 9
f = 6.53, FNo. = 1.80, 2ω = 50.2°

| Si | Ri | Di | Ndj | vdj |
|---|---|---|---|---|
| 10 | ∞ | 1.0000 | 1.51680 | 64.20 |
| 11 | ∞ | 1.4702 | | |

TABLE 18

EXAMPLE 9

| | SURFACE NUMBER | |
|---|---|---|
| | 3 | 4 |
| KA | 0.0000000E+00 | 0.0000000E+00 |
| A3 | 2.2741981E−03 | 2.0452221E−02 |
| A4 | 1.3529127E−03 | −5.7388605E−02 |
| A5 | 1.8968717E−03 | 1.0663396E−01 |
| A6 | −2.9727994E−04 | −1.0750430E−01 |
| A7 | −8.6087094E−05 | 5.8822930E−02 |
| A8 | −1.1924552E−05 | −1.2859451E−02 |

TABLE 18-continued

EXAMPLE 9

SURFACE NUMBER

| | 6 | 7 | 8 |
|---|---|---|---|
| KA | 0.0000000E+00 | 0.0000000E+00 | 1.1600226E+00 |
| A3 | −1.0901124E−02 | −7.6815244E−02 | −6.4725637E−02 |
| A4 | 6.9415689E−02 | 7.2239633E−02 | 3.5467204E−02 |
| A5 | −1.4828762E−01 | −5.0261871E−02 | −3.6237705E−03 |
| A6 | 1.4113558E−01 | 2.5996570E−02 | −9.4296304E−03 |
| A7 | −6.4229675E−02 | −1.3259914E−02 | 2.6495263E−03 |
| A8 | 8.8255463E−03 | 3.2454690E−03 | 1.9101706E−04 |
| A9 | 5.7107579E−04 | 7.5417663E−05 | 4.3314449E−05 |
| A10 | 5.5243900E−04 | 3.9928360E−05 | −9.6951340E−06 |
| A11 | 2.5426469E−04 | 1.0810583E−06 | −3.0659033E−05 |
| A12 | −2.8465455E−06 | −9.0473242E−06 | |
| A13 | −4.5501371E−05 | −7.0787836E−06 | |
| A14 | −4.2558509E−05 | −4.0568879E−06 | |
| A15 | −4.0366128E−05 | −1.2023945E−06 | |
| A16 | 1.9250941E−07 | −5.9597771E−07 | |
| A17 | −3.1548545E−06 | 2.8799753E−07 | |
| A18 | 8.3160674E−06 | −1.5798352E−09 | |
| A19 | 4.1153418E−06 | 1.1330945E−07 | |
| A20 | −3.0135856E−06 | −2.6400901E−08 | |

Example 10

Figure 10:
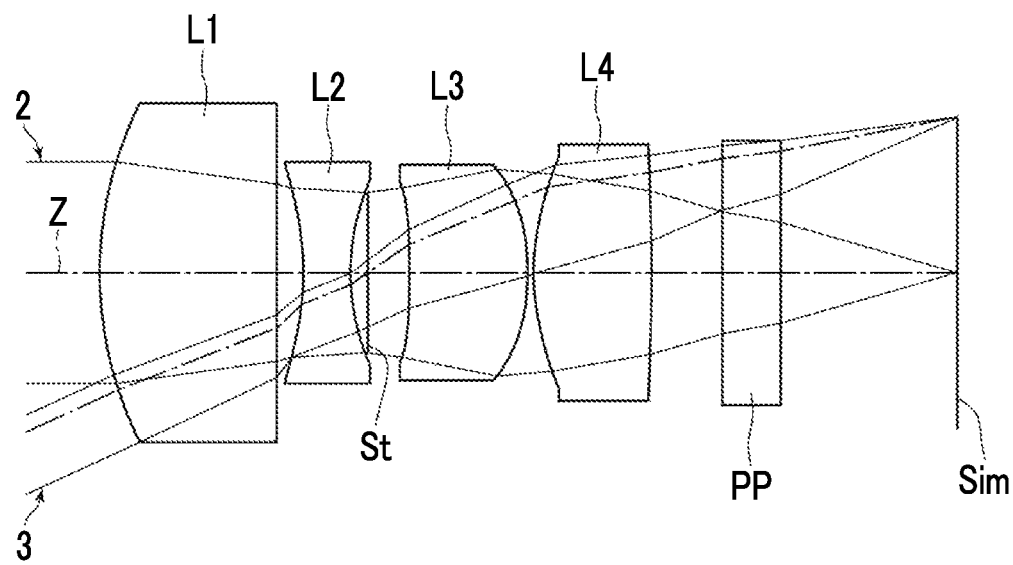
FIG. 10 is a sectional view showing the configuration and optical paths of an imaging lens of Example 10 of the invention.
Figure 25:
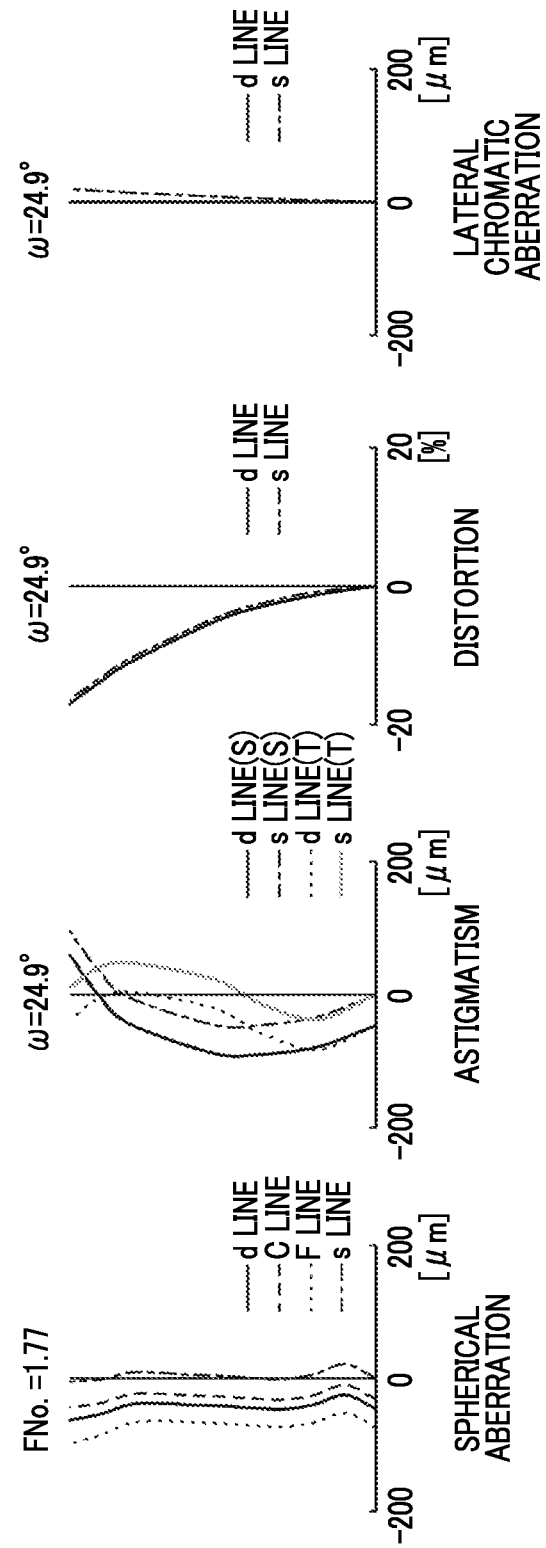
FIG. 25 shows a spherical aberration diagram, an astigmatism diagram, a distortion diagram, and a lateral chromatic aberration diagram of the imaging lens of Example 10 of the invention.

FIG. 10 is a sectional view showing the lens configuration and optical paths of an imaging lens of Example 10. Table 19 shows basic lens data of the imaging lens of Example 10, Table 20 shows aspheric coefficients, and FIG. 25 shows respective aberration diagrams in a state of being focused on an object at infinity.

TABLE 19

EXAMPLE 10
f = 6.82, FNo. = 1.80, 2ω = 50.6°

| Si | Ri | Di | Ndj | vdj |
|---|---|---|---|---|
| 1 | 6.5642 | 3.0000 | 1.90366 | 31.31 |
| 2 | ∞ | 0.4500 | | |
| *3 | −4.7919 | 0.8000 | 1.63360 | 23.61 |
| *4 | 4.0654 | 0.3000 | | |
| 5 (St) | ∞ | 0.7000 | | |
| *6 | −19.4015 | 2.0000 | 1.53114 | 55.44 |
| *7 | −8.1278 | 0.1000 | | |
| *8 | 2.7865 | 2.0000 | 1.53114 | 55.44 |
| 9 | −45.6663 | 1.2000 | | |
| 10 | ∞ | 1.0000 | 1.51680 | 64.20 |
| 11 | ∞ | 2.9413 | | |

TABLE 20

EXAMPLE 10

SURFACE NUMBER

| | 3 | 4 |
|---|---|---|
| KA | 0.0000000E+00 | 0.0000000E+00 |
| A3 | 2.2741981E−03 | 2.6350969E−02 |
| A4 | 1.3529127E−03 | −7.3511189E−02 |
| A5 | 1.8968717E−03 | 1.2205444E−01 |
| A6 | −2.9727994E−04 | −1.1383144E−01 |
| A7 | −8.6087094E−05 | 5.7552233E−02 |
| A8 | −1.1924552E−05 | −1.2213049E−02 |

TABLE 20-continued

EXAMPLE 10

SURFACE NUMBER

| | 6 | 7 | 8 |
|---|---|---|---|
| KA | 0.0000000E+00 | 0.0000000E+00 | 1.1600226E+00 |
| A3 | −7.8227922E−03 | −9.6310903E−02 | −8.3598400E−02 |
| A4 | 4.4374492E−02 | 3.8811439E−02 | 7.4248377E−03 |
| A5 | −1.2755063E−01 | −1.9245687E−02 | 2.6084207E−02 |
| A6 | 1.3562182E−01 | 2.0570617E−02 | −1.6676168E−02 |
| A7 | −6.6336357E−02 | −1.4116293E−02 | 2.2020280E−03 |
| A8 | 8.3035755E−03 | 3.1864261E−03 | 2.6915348E−04 |
| A9 | 6.6410533E−04 | 4.1789440E−05 | 5.7634076E−05 |
| A10 | 7.1255516E−04 | 1.9122695E−05 | −9.7119742E−07 |
| A11 | 3.3571090E−04 | −6.4046648E−06 | −2.0438890E−05 |
| A12 | 7.0920147E−06 | −6.7087024E−06 | |
| A13 | −6.4617860E−05 | −3.3798146E−06 | |
| A14 | −6.7679486E−05 | −2.4801159E−06 | |
| A15 | −3.0328317E−05 | −3.7190907E−07 | |
| A16 | 1.6042375E−05 | −2.7198465E−07 | |
| A17 | −1.1139270E−05 | 4.5766857E−07 | |
| A18 | 4.1188865E−06 | 7.8968951E−08 | |
| A19 | 4.7292792E−06 | 4.1901801E−08 | |
| A20 | −2.0784203E−06 | −3.7384941E−08 | |

Example 11

Figure 11:
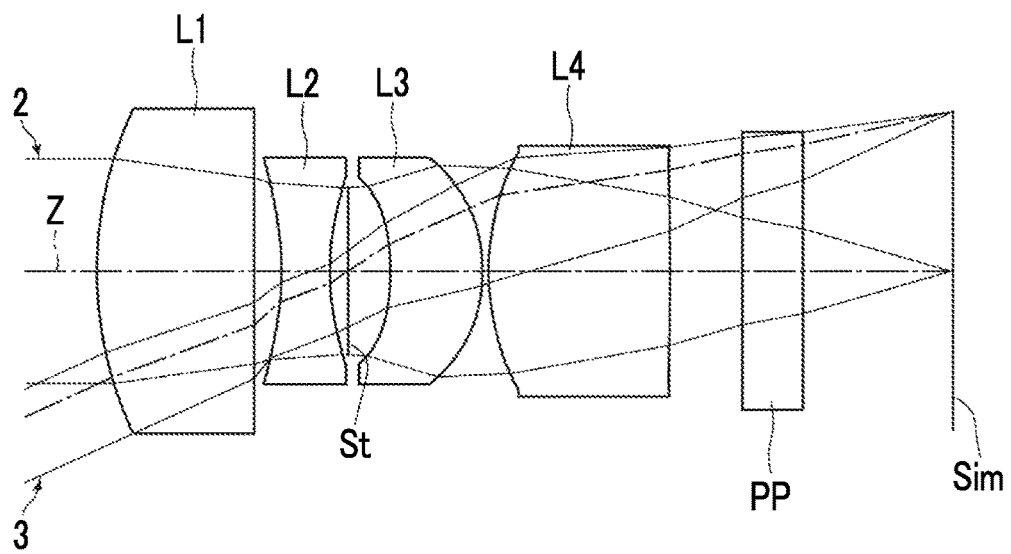
FIG. 11 is a sectional view showing the configuration and optical paths of an imaging lens of Example 11 of the invention.
Figure 26:
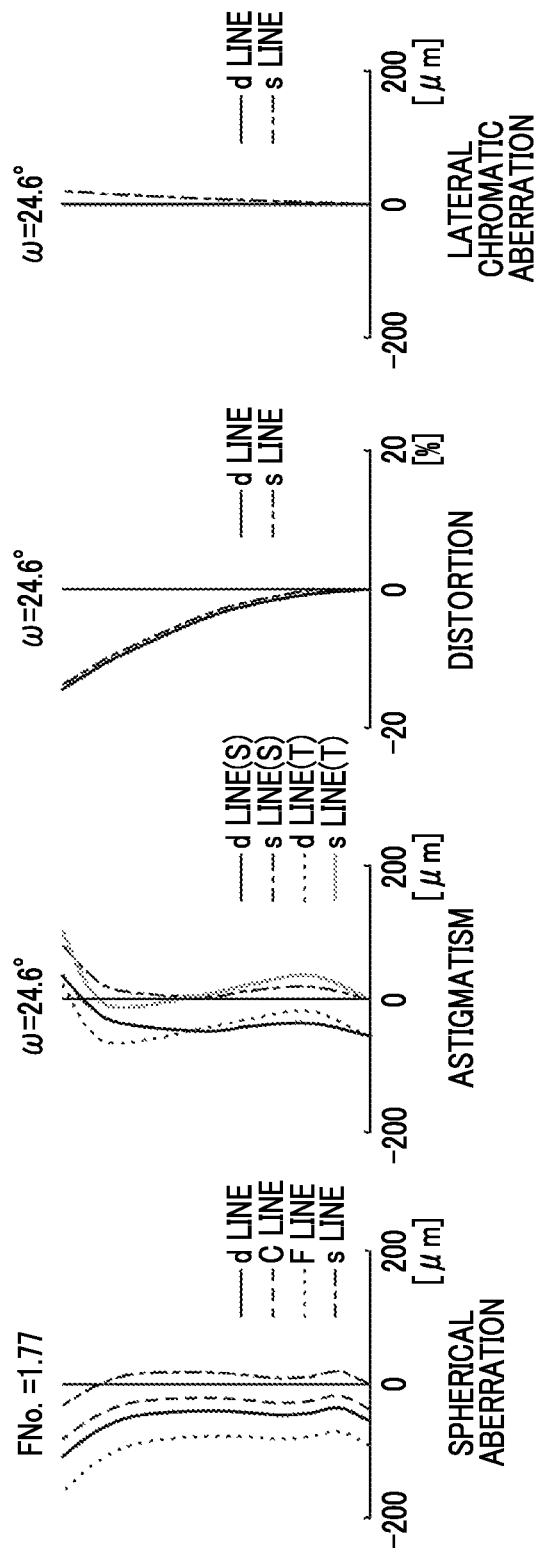
FIG. 26 shows a spherical aberration diagram, an astigmatism diagram, a distortion diagram, and a lateral chromatic aberration diagram of the imaging lens of Example 11 of the invention.

FIG. 11 is a sectional view showing the lens configuration and optical paths of an imaging lens of Example 11. Table 21 shows basic lens data of the imaging lens of Example 11, Table 22 shows aspheric coefficients, and FIG. 26 shows respective aberration diagrams in a state of being focused on an object at infinity.

TABLE 21

EXAMPLE 11
f = 6.69, FNo. = 1.80, 2ω = 50.0°

| Si | Ri | Di | Ndj | vdj |
|---|---|---|---|---|
| 1 | 6.4468 | 2.6000 | 1.90366 | 31.31 |
| 2 | ∞ | 0.4500 | | |
| *3 | −5.1516 | 0.8000 | 1.63360 | 23.61 |
| *4 | 4.5142 | 0.3000 | | |
| 5 (St) | ∞ | 0.7000 | | |
| *6 | −4.1892 | 1.5209 | 1.53114 | 55.44 |
| *7 | −3.9776 | 0.1000 | | |
| *8 | 2.8318 | 3.0000 | 1.53114 | 55.44 |
| *9 | −109.2822 | 1.2000 | | |
| 10 | ∞ | 1.0000 | 1.51680 | 64.20 |
| 11 | ∞ | 2.4257 | | |

TABLE 22

EXAMPLE 11

| | SURFACE NUMBER | |
|---|---|---|
| | 3 | 4 |
| KA | 0.0000000E+00 | 0.0000000E+00 |
| A3 | 2.2741981E-03 | 2.1253833E-02 |
| A4 | 1.3529127E-03 | -6.9377651E-02 |
| A5 | 1.8968717E-03 | 1.1754122E-01 |
| A6 | -2.9727994E-04 | -1.1295246E-01 |
| A7 | -8.6087094E-05 | 5.7845558E-02 |
| A8 | -1.1924552E-05 | -1.2531969E-02 |

| | SURFACE NUMBER | | | |
|---|---|---|---|---|
| | 6 | 7 | 8 | 9 |
| KA | 0.0000000E+00 | 0.0000000E+00 | 1.1600226E+00 | 1.0000000E+00 |
| A3 | 2.0035781E-03 | -9.2969481E-02 | -8.7771835E-02 | 2.1924890E-03 |
| A4 | 1.8355296E-02 | 4.0710493E-02 | 2.0074535E-02 | -3.2887883E-02 |
| A5 | -1.2555852E-01 | -2.4521762E-02 | 2.2984189E-02 | -6.8661731E-04 |
| A6 | 1.3604802E-01 | 2.2087781E-02 | -1.7270576E-02 | 1.2219516E-03 |
| A7 | -6.6633174E-02 | -1.4280318E-02 | 2.5165439E-03 | -1.2147368E-04 |
| A8 | 7.9496932E-03 | 3.1527749E-03 | 3.4951598E-04 | -2.5247503E-05 |
| A9 | 4.0732216E-04 | 5.4616528E-05 | 7.2759816E-05 | -1.0060383E-05 |
| A10 | 6.7002056E-04 | 2.5177110E-05 | -1.9873366E-06 | -3.5199431E-06 |
| A11 | 3.5740774E-04 | -6.8785363E-06 | -2.4952922E-05 | 2.5158087E-07 |
| A12 | 4.5984776E-05 | -1.1788663E-05 | | 1.4966181E-06 |
| A13 | -4.8086223E-05 | -2.9265695E-06 | | 1.0935638E-06 |
| A14 | -4.2917095E-05 | -1.9875389E-06 | | 4.8170655E-07 |
| A15 | -4.9114816E-05 | -3.3425092E-08 | | 1.6301883E-08 |
| A16 | -1.0845443E-05 | -9.7531463E-08 | | -1.4923426E-07 |
| A17 | -2.5002837E-06 | 3.4127173E-07 | | |
| A18 | 4.5661386E-06 | 5.9301006E-08 | | |
| A19 | 4.0263803E-06 | -4.9378497E-09 | | |
| A20 | -8.4370400E-07 | -1.5236796E-08 | | |

Example 12

Figure 12:
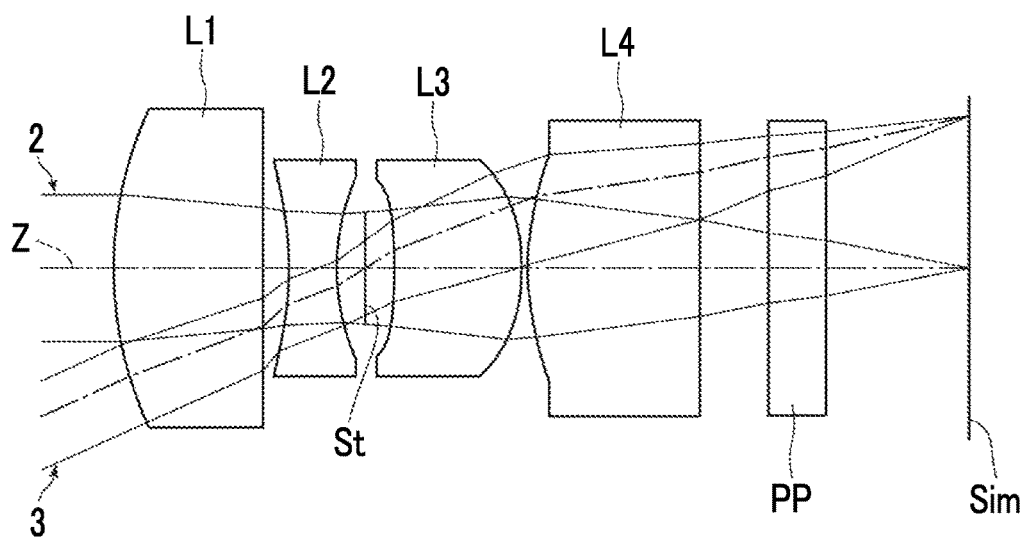
FIG. 12 is a sectional view showing the configuration and optical paths of an imaging lens of Example 12 of the invention.
Figure 27:
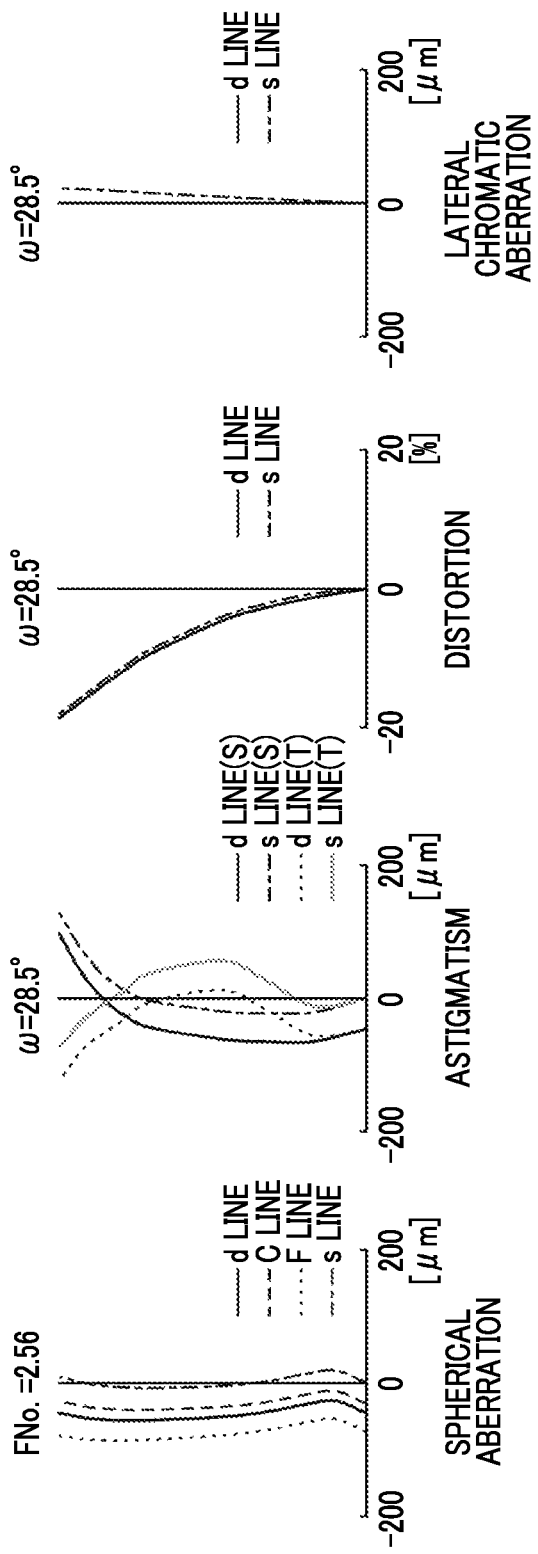
FIG. 27 shows a spherical aberration diagram, an astigmatism diagram, a distortion diagram, and a lateral chromatic aberration diagram of the imaging lens of Example 12 of the invention.

FIG. 12 is a sectional view showing the lens configuration and optical paths of an imaging lens of Example 12. Table 23 shows basic lens data of the imaging lens of Example 12, Table 24 shows aspheric coefficients, and FIG. 27 shows respective aberration diagrams in a state of being focused on an object at infinity.

TABLE 23

EXAMPLE 12 f = 6.68, FNo. = 2.60, 2ω = 57.8°

| Si | Ri | Di | Ndj | νdj |
|---|---|---|---|---|
| 1 | 6.6913 | 2.6000 | 1.90366 | 31.31 |
| 2 | ∞ | 0.4500 | | |
| *3 | -5.5642 | 0.8300 | 1.63360 | 23.61 |
| *4 | 4.0654 | 0.5000 | | |
| 5 (St) | ∞ | 0.5000 | | |
| *6 | -13.0359 | 2.2167 | 1.53114 | 55.44 |
| *7 | -6.7842 | 0.1000 | | |
| *8 | 2.8680 | 3.0000 | 1.53114 | 55.44 |
| 9 | ∞ | 1.2000 | | |
| 10 | ∞ | 1.0000 | 1.51680 | 64.20 |
| 11 | ∞ | 2.4398 | | |

TABLE 24

EXAMPLE 12

| | SURFACE NUMBER | |
|---|---|---|
| | 3 | 4 |
| KA | 0.0000000E+00 | 0.0000000E+00 |
| A3 | 2.2741981E-03 | 1.7217507E-02 |
| A4 | 1.3529127E-03 | -5.8682325E-02 |
| A5 | 1.8968717E-03 | 1.1373986E-01 |
| A6 | -2.9727994E-04 | -1.1320657E-01 |
| A7 | -8.6087094E-05 | 5.7544946E-02 |
| A8 | -1.1924552E-05 | -1.1839906E-02 |

| | SURFACE NUMBER | | |
|---|---|---|---|
| | 6 | 7 | 8 |
| KA | 0.0000000E+00 | 0.0000000E+00 | 1.1600226E+00 |
| A3 | -1.6043525E-02 | -1.0640996E-01 | -9.3194640E-02 |
| A4 | 5.0504212E-02 | 3.9070752E-02 | 6.7001106E-03 |
| A5 | -1.3232249E-01 | -1.8395045E-02 | 3.2184216E-02 |
| A6 | 1.3400484E-01 | 2.1155696E-02 | -1.9215208E-02 |
| A7 | -6.6601322E-02 | -1.4474219E-02 | 2.3829390E-03 |
| A8 | 8.2667145E-03 | 3.0742957E-03 | 3.2757586E-04 |
| A9 | 6.7153208E-04 | 2.4774994E-05 | 6.1895039E-05 |
| A10 | 7.7424426E-04 | 2.4631900E-05 | -8.5637772E-07 |
| A11 | 3.7833671E-04 | -1.1431849E-06 | -1.9073726E-05 |
| A12 | -1.4561425E-06 | -7.8943347E-06 | |
| A13 | -5.6211589E-05 | -1.3698634E-06 | |
| A14 | -5.4419047E-05 | -1.6397874E-06 | |
| A15 | -1.9668222E-04 | -1.2692899E-07 | |
| A16 | 9.6127817E-05 | -2.2975220E-07 | |
| A17 | -1.8305285E-05 | 2.6834493E-07 | |
| A18 | -2.0204082E-05 | 9.5957292E-09 | |
| A19 | 1.5979814E-05 | -9.6671586E-09 | |
| A20 | -1.7745003E-06 | -6.1944420E-09 | |

Example 13

Figure 13:
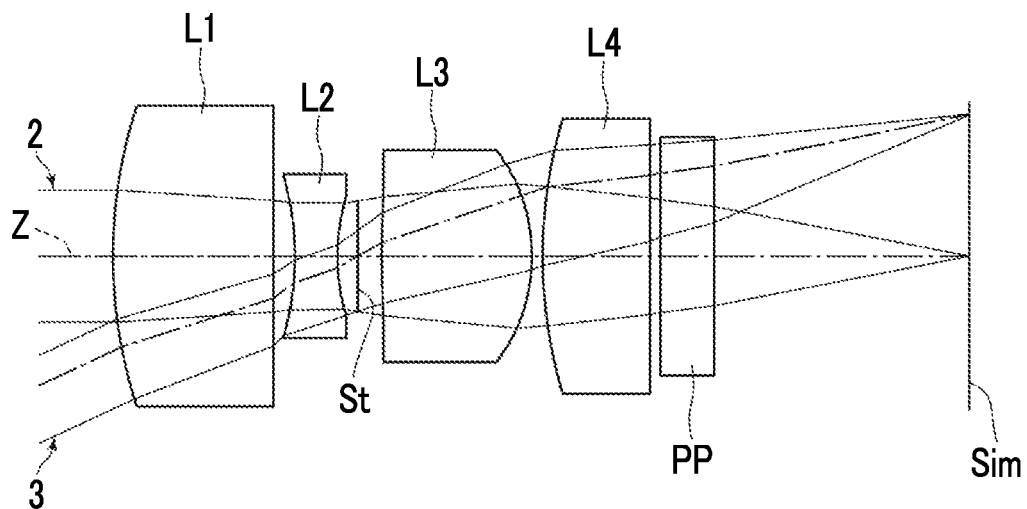
FIG. 13 is a sectional view showing the configuration and optical paths of an imaging lens of Example 13 of the invention.
Figure 28:
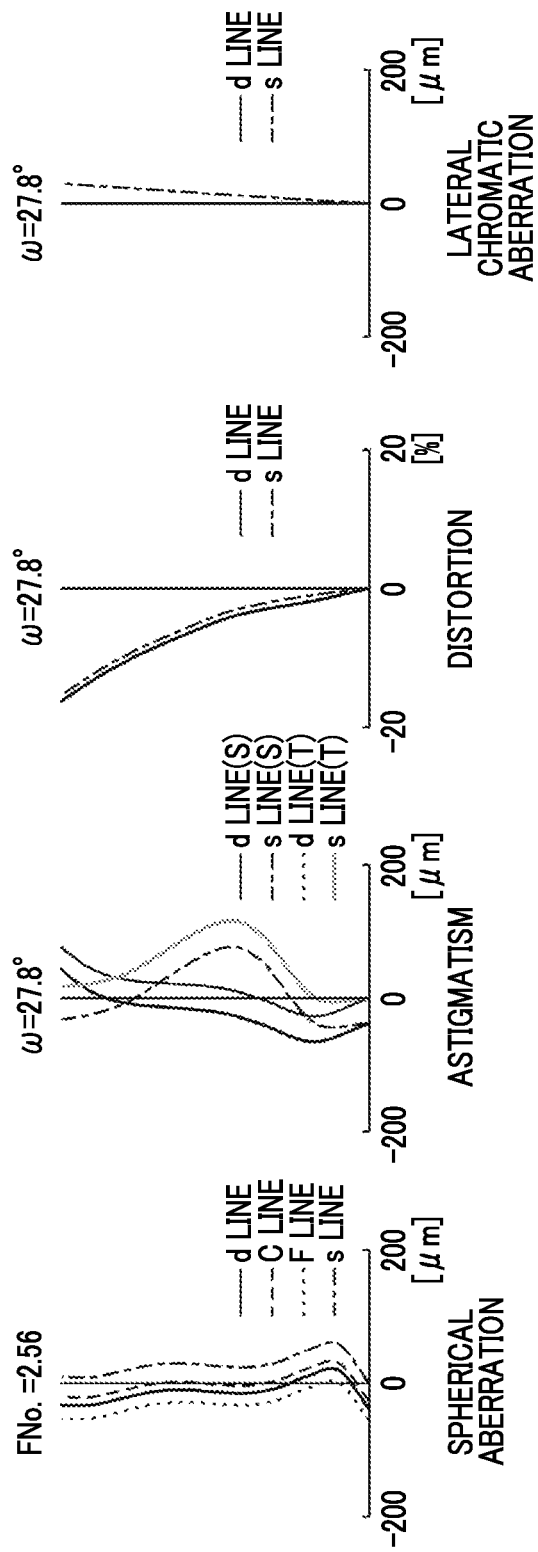
FIG. 28 shows a spherical aberration diagram, an astigmatism diagram, a distortion diagram, and a lateral chromatic aberration diagram of the imaging lens of Example 13 of the invention.

FIG. 13 is a sectional view showing the lens configuration and optical paths of an imaging lens of Example 13. Table 25 shows basic lens data of the imaging lens of Example 13, Table 26 shows aspheric coefficients, and FIG. 28 shows respective aberration diagrams in a state of being focused on an object at infinity.

TABLE 25

EXAMPLE 13
f = 6.43, FNo. = 2.60, 2ω = 56.4°

| Si | Ri | Di | Ndj | vdj |
|---|---|---|---|---|
| 1 | 9.3187 | 3.0000 | 2.00100 | 29.13 |
| 2 | ∞ | 0.4000 | | |
| *3 | −4.8536 | 0.8000 | 1.63360 | 23.61 |
| *4 | 4.1006 | 0.3815 | | |
| 5 (St) | ∞ | 0.4500 | | |
| *6 | 16.2547 | 2.8000 | 1.53114 | 55.44 |
| *7 | −3.5571 | 0.2000 | | |
| 8 | 9.2079 | 2.0000 | 1.77250 | 49.60 |
| 9 | ∞ | 0.2000 | | |
| 10 | ∞ | 1.0000 | 1.51680 | 64.20 |
| 11 | ∞ | 4.7255 | | |

TABLE 26

EXAMPLE 13

| | SURFACE NUMBER | | | |
|---|---|---|---|---|
| | 3 | 4 | 6 | 7 |
| KA | 0.0000000E+00 | 0.0000000E+00 | 0.0000000E+00 | 0.0000000E+00 |
| A3 | 2.2741981E−03 | 1.9896045E−02 | −2.4111549E−02 | −1.0681893E−02 |
| A4 | 1.3529127E−03 | −6.6606611E−02 | 8.7255257E−02 | 1.8488144E−02 |
| A5 | 1.8968717E−03 | 1.2421884E−01 | −1.7725113E−01 | −2.3338267E−02 |
| A6 | −2.9727994E−04 | −1.1541948E−01 | 1.7200482E−01 | 1.1533534E−02 |
| A7 | −8.6087094E−05 | 5.6800325E−02 | −8.2735017E−02 | −2.6925309E−03 |
| A8 | −1.1924552E−05 | −1.1180052E−02 | 1.5572438E−02 | 1.5499083E−04 |

Example 14

Figure 14:
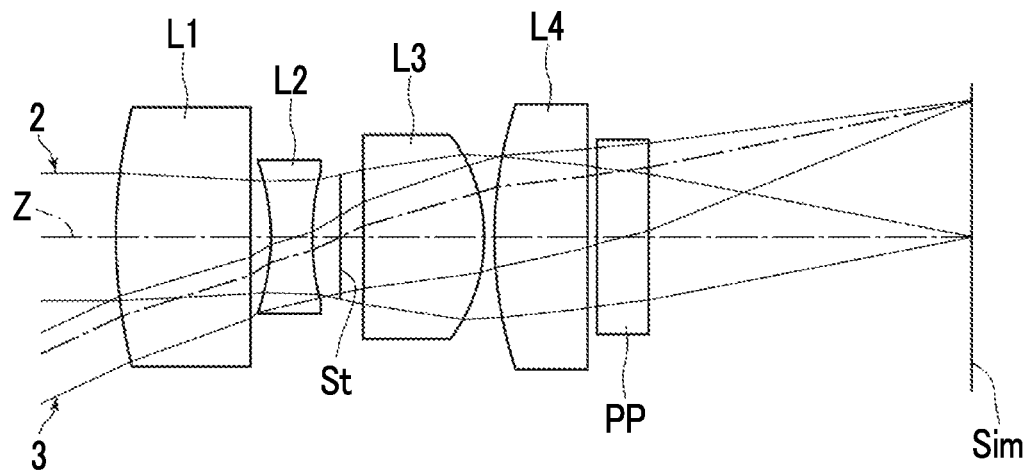
FIG. 14 is a sectional view showing the configuration and optical paths of an imaging lens of Example 14 of the invention.
Figure 29:
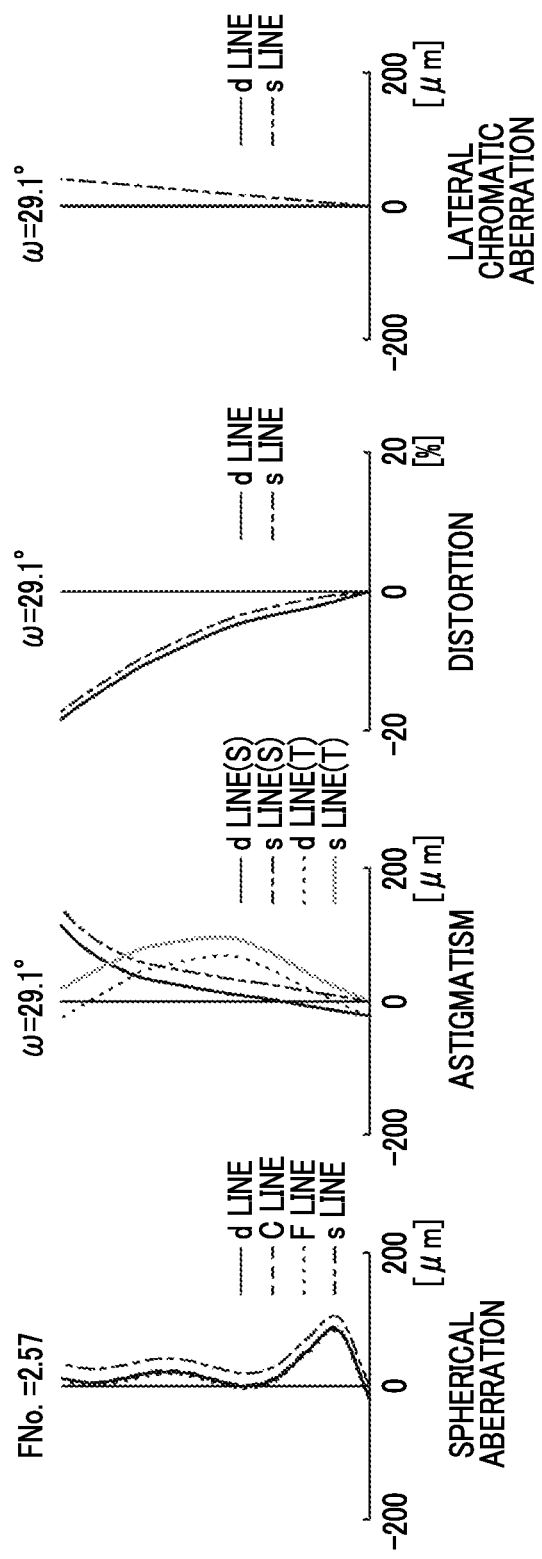
FIG. 29 shows a spherical aberration diagram, an astigmatism diagram, a distortion diagram, and a lateral chromatic aberration diagram of the imaging lens of Example 14 of the invention.

FIG. 14 is a sectional view showing the lens configuration and optical paths of an imaging lens of Example 14. Table 27 shows basic lens data of the imaging lens of Example 14, Table 28 shows aspheric coefficients, and FIG. 29 shows respective aberration diagrams in a state of being focused on an object at infinity.

TABLE 27

EXAMPLE 14
f = 6.42, FNo. = 2.60, 2ω = 59.4°

| Si | Ri | Di | Ndj | vdj |
|---|---|---|---|---|
| 1 | 10.5000 | 2.6000 | 1.80400 | 46.58 |
| 2 | ∞ | 0.4000 | | |
| *3 | −4.0654 | 0.8000 | 1.63360 | 23.61 |
| *4 | 5.8796 | 0.5531 | | |
| 5 (St) | ∞ | 0.4500 | | |
| *6 | 140.1037 | 2.3366 | 1.53114 | 55.44 |
| *7 | −3.5571 | 0.2000 | | |
| 8 | 8.4389 | 1.8000 | 1.77250 | 49.60 |
| 9 | ∞ | 0.1846 | | |
| 10 | ∞ | 1.0000 | 1.51680 | 64.20 |
| 11 | ∞ | 6.2334 | | |

TABLE 28

EXAMPLE 14

| | SURFACE NUMBER | | | |
|---|---|---|---|---|
| | 3 | 4 | 6 | 7 |
| KA | 0.0000000E+00 | 0.0000000E+00 | 0.0000000E+00 | 0.0000000E+00 |
| A3 | 2.2741981E−03 | 3.7312088E−02 | −1.1951082E−02 | −6.6417989E−03 |
| A4 | 1.3529127E−03 | −1.4068658E−01 | 4.0934234E−02 | 4.8931499E−03 |

TABLE 28-continued

EXAMPLE 14

SURFACE NUMBER

| | 3 | 4 | 6 | 7 |
|---|---|---|---|---|
| A5 | 1.8968717E−03 | 2.7884770E−01 | −8.3459534E−02 | −5.6035212E−03 |
| A6 | −2.9727994E−04 | −2.7744454E−01 | 7.7858836E−02 | 7.9882907E−04 |
| A7 | −8.6087094E−05 | 1.4038229E−01 | −3.6132608E−02 | 3.4577107E−04 |
| A8 | −1.1924552E−05 | −2.8019434E−02 | 6.7218281E−03 | −1.5064765E−04 |

Example 15

Figure 15:
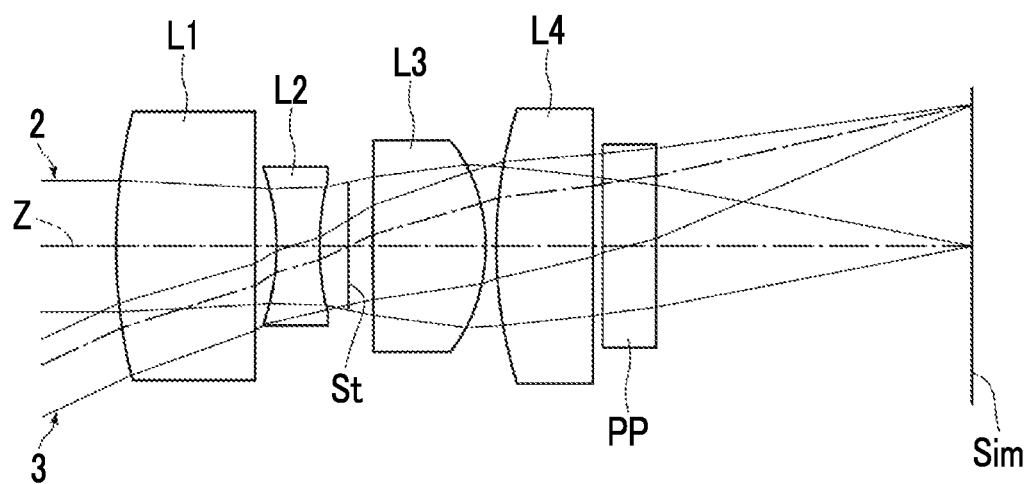
FIG. 15 is a sectional view showing the configuration and optical paths of an imaging lens of Example 15 of the invention.
Figure 30:
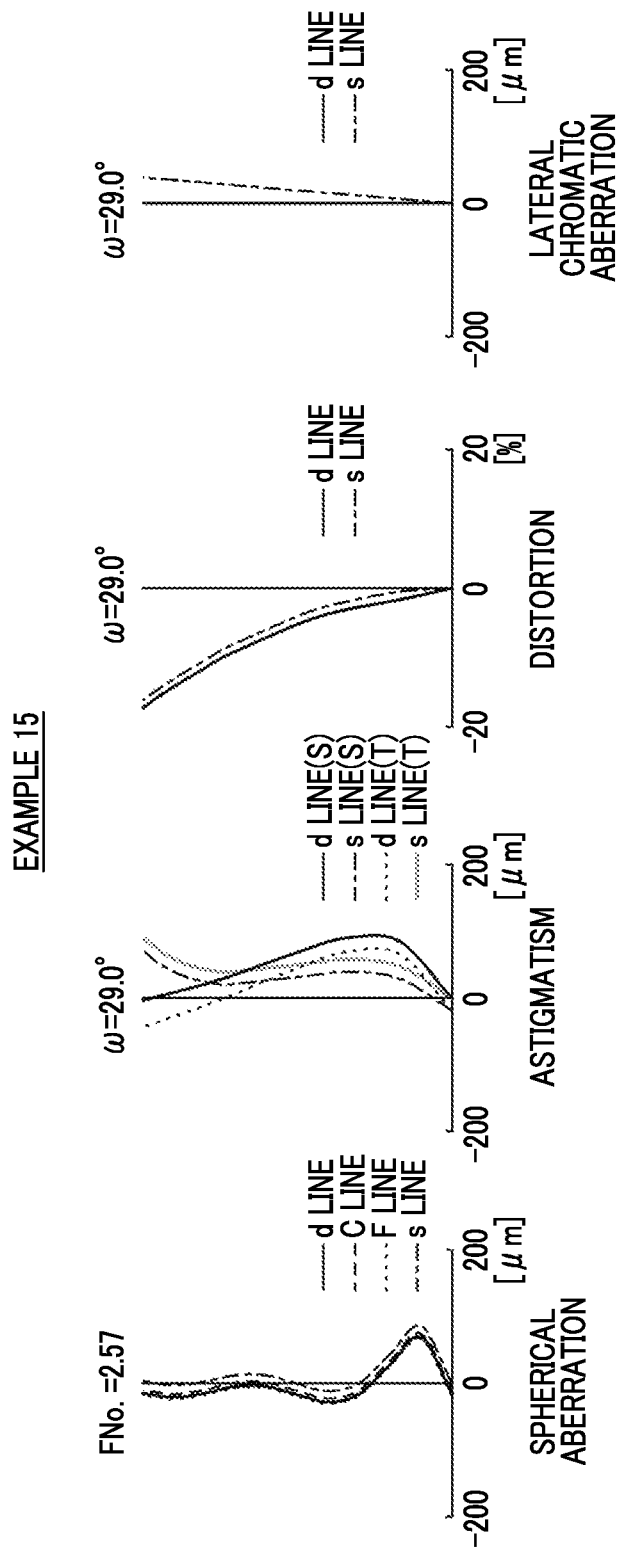
FIG. 30 shows a spherical aberration diagram, an astigmatism diagram, a distortion diagram, and a lateral chromatic aberration diagram of the imaging lens of Example 15 of the invention.

FIG. 15 is a sectional view showing the lens configuration and optical paths of an imaging lens of Example 15. Table 29 shows basic lens data of the imaging lens of Example 15, Table 30 shows aspheric coefficients, and FIG. 30 shows respective aberration diagrams in a state of being focused on an object at infinity.

TABLE 29

EXAMPLE 15
$f = 6.37$, FNo. $= 2.60$, $2\omega = 59.0°$

| Si | Ri | Di | Ndj | vdj |
|---|---|---|---|---|
| 1 | 10.5000 | 2.6000 | 1.80400 | 46.58 |
| 2 | ∞ | 0.4000 | | |
| *3 | −4.0654 | 0.8000 | 1.63360 | 23.61 |
| *4 | 6.1107 | 0.5363 | | |
| 5 (St) | ∞ | 0.4500 | | |
| *6 | 35.9379 | 2.1066 | 1.53114 | 55.44 |
| *7 | −3.5571 | 0.2000 | | |
| 8 | 8.9245 | 1.8000 | 1.80400 | 46.58 |
| 9 | ∞ | 0.1846 | | |
| 10 | ∞ | 1.0000 | 1.51680 | 64.20 |
| 11 | ∞ | 5.8646 | | |

TABLE 30

EXAMPLE 15

SURFACE NUMBER

| | 3 | 4 | 6 | 7 |
|---|---|---|---|---|
| KA | 0.0000000E+00 | 0.0000000E+00 | 0.0000000E+00 | 0.0000000E+00 |
| A3 | 2.2741981E−03 | 2.3867273E−02 | −9.3656196E−03 | −5.4272634E−04 |
| A4 | 1.3529127E−03 | −1.0770269E−01 | 4.6123315E−02 | −4.5619504E−03 |
| A5 | 1.8968717E−03 | 2.5357410E−01 | −9.8889895E−02 | 1.4836479E−03 |
| A6 | −2.9727994E−04 | −2.8950542E−01 | 9.2352661E−02 | −1.4363318E−03 |
| A7 | −8.6087094E−05 | 1.6643583E−01 | −4.1509573E−02 | 2.8801713E−04 |
| A8 | −1.1924552E−05 | −3.7435977E−02 | 7.4171151E−03 | −1.7782189E−05 |

Table 31 shows corresponding values of the conditional expressions (1) to (9) of the imaging lenses of Examples 1 to 15. The values shown in Table 31 are for d-line.

TABLE 31

| EXPRESSION NUMBER | | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|---|
| (1) | f/f234 | 1.23 | 1.16 | 0.79 | 0.95 | 0.70 | 0.74 | 0.72 | 0.74 |
| (2) | vd1 | 31.31 | 31.31 | 31.31 | 31.31 | 31.31 | 31.31 | 31.31 | 31.31 |
| (3) | vd1 − vd2 | 7.7 | 7.7 | 7.7 | 7.7 | 7.7 | 7.7 | 7.7 | 7.7 |
| (4) | (R1 + R2)/(R1 − R2) | −1 | −1 | −1 | −1 | −1 | −1 | −1 | −4.708 |
| (5) | D1/f | 0.44 | 0.44 | 0.42 | 0.38 | 0.39 | 0.38 | 0.40 | 0.39 |
| (6) | (vd3 + vd4)/2 − vd2 | 31.83 | 31.83 | 31.83 | 31.83 | 31.83 | 31.83 | 31.83 | 31.83 |
| (7) | vd1 − (vd3 + vd4)/2 | −24.13 | −24.13 | −24.13 | −24.13 | −24.13 | −24.13 | −24.13 | −24.13 |
| (8) | (R8 + R9)/(R8 − R9) | −1.08 | −1.00 | −1.00 | −0.84 | −1.00 | −1.00 | −1.67 | −1.66 |
| (9) | 2ω | 50.4 | 50.0 | 42.0 | 50.4 | 49.8 | 49.8 | 49.8 | 51.4 |

| EXPRESSION NUMBER | | EXAMPLE 9 | EXAMPLE 10 | EXAMPLE 11 | EXAMPLE 12 | EXAMPLE 13 | EXAMPLE 14 | EXAMPLE 15 |
|---|---|---|---|---|---|---|---|---|
| (1) | f/f234 | 0.74 | 1.02 | 0.93 | 1.00 | 1.03 | 1.00 | 0.99 |
| (2) | vd1 | 31.31 | 31.31 | 31.31 | 31.31 | 29.13 | 46.58 | 46.58 |
| (3) | vd1 − vd2 | 7.7 | 7.7 | 7.7 | 7.7 | 5.52 | 22.97 | 22.97 |
| (4) | (R1 + R2)/(R1 − R2) | −1 | −1 | −1 | −1 | −1 | −1 | −1 |

TABLE 31-continued

| (5) | D1/f | 0.40 | 0.44 | 0.39 | 0.39 | 0.47 | 0.40 | 0.41 |
|---|---|---|---|---|---|---|---|---|
| (6) | (vd3 + vd4)/2 − vd2 | 31.83 | 31.83 | 31.83 | 31.83 | 28.91 | 28.91 | 27.4 |
| (7) | vd1 − (vd3 + vd4)/2 | −24.13 | −24.13 | −24.13 | −24.13 | −23.39 | −5.94 | −4.43 |
| (8) | (R8 + R9)/(R8 − R9) | −1.73 | −0.88 | −0.95 | −1.00 | −1.00 | −1.00 | −1.00 |
| (9) | 2ω | 50.2 | 50.6 | 50.0 | 57.8 | 56.4 | 59.4 | 59.0 |

As can be understood from data described above, all of the imaging lenses of Examples 1 to 15 have a small number of lenses, that is, the four lenses and are compact, and are high-performance imaging lenses which have the maximum full angle of view within a range of 40° to 60° and in which respective aberrations are satisfactorily corrected in a region of visible light to near infrared light.

Figure 31:
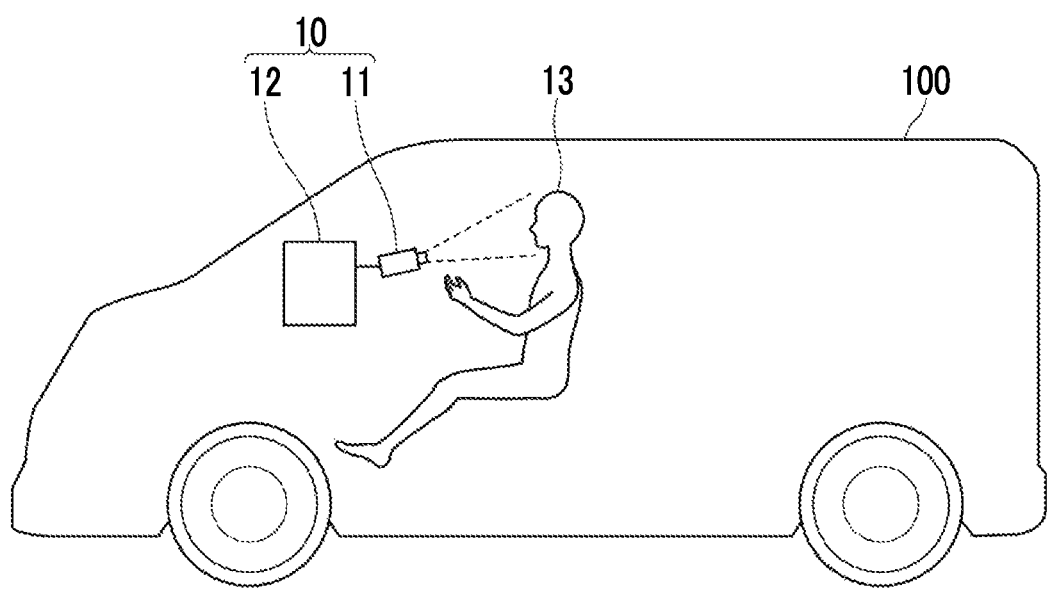
FIG. 31 is a diagram illustrating an application example of an imaging apparatus according to an embodiment of the invention.

Next, an imaging apparatus according to an embodiment of the invention will be described. An example of a camera which is mounted in a driver monitoring system as an embodiment of an imaging apparatus of the invention will be described. FIG. 31 shows a manner in which the camera is mounted in a vehicle.

In FIG. 31, a driver monitoring system 10 which is provided inside a vehicle 100 includes a camera 11 and a control unit 12. The camera 11 includes the imaging lens according to the embodiment of the invention, and an imaging element which converts an optical image formed by the imaging lens to an electrical signal. The camera 11 acquires a face image of a driver 13 by regularly capturing an image including the face of the driver 13 using visible light and near infrared light. The control unit 12 analyzes the face image by software, determines the state of the driver 13, and when dozing and/or looking-aside is detected, outputs a warning.

Although the invention has been described in connection with the embodiment and the examples, the invention is not limited to the foregoing embodiment and examples, and various modifications may be made. For example, the values of the radius of curvature, the surface distance, the refractive index, the Abbe number, and the aspheric coefficient of each lens are not limited to the values shown in the respective examples of numerical values, and may take other values.

The imaging apparatus of the invention is not limited to that having the above-described configuration. The driver monitoring system described in the foregoing embodiment is not limited to a vehicle, and can be applied to an arbitrary mobile object which is driven by the driver. The imaging apparatus of the invention is not limited to a camera which is provided in a mobile object, and can be applied to, for example, a camera for a portable terminal, a surveillance camera, a digital camera, or the like.

EXPLANATION OF REFERENCES

2: axial light beam
3: off-axial light beam
10: driver monitoring system
11: camera
12: control unit
13: driver
100: vehicle
L1: first lens
L2: second lens
L3: third lens
L4: fourth lens
PP: optical member
Sim: image plane
St: aperture stop
Z: optical axis
ω: half value of maximum full angle of view

What is claimed is:

1. An imaging lens consisting of, in order from an object side:
a first lens having positive refractive power;
a second lens having negative refractive power;
a third lens having positive refractive power; and
a fourth lens having positive refractive power,
wherein all of the following conditional expressions (1) to (4) are satisfied;

$$0.4 < f/f234 < 2 \quad (1)$$

$$vd1 < 50 \quad (2)$$

$$5 < vd1 - vd2 < 26 \quad (3)$$

$$-5 < (R1+R2)/(R1-R2) < -0.9 \quad (4)$$

where
f: a focal length of an entire system
f234: a combined focal length of the second lens, the third lens, and the fourth lens
vd1: an Abbe number for d-line of the first lens
vd2: an Abbe number for d-line of the second lens
R1: a radius of curvature of a surface of the first lens on the object side
R2: a radius of curvature of a surface of the first lens on an image side.

2. The imaging lens according to claim 1, wherein the following conditional expression (1-1) is satisfied;

$$0.55 < f/f234 < 1.45 \quad (1\text{-}1).$$

3. The imaging lens according to claim 1, wherein the following conditional expression (5) is satisfied;

$$0.2 < D1/f \quad (5)$$

where
D1: a thickness of the first lens on an optical axis.

4. The imaging lens according to claim 2, wherein the following conditional expression (5) is satisfied;

$$0.2 < D1/f \quad (5)$$

where
D1: a thickness of the first lens on an optical axis.

5. The imaging lens according to 1, wherein the following conditional expression (6) is satisfied;

$$27 < (vd3+vd4)/2 - vd2 < 34 \quad (6)$$

where
vd3: an Abbe number for d-line of the third lens
vd4: an Abbe number for d-line of the fourth lens.

6. The imaging lens according to 2, wherein the following conditional expression (6) is satisfied;

$$27 < (vd3+vd4)/2 - vd2 < 34 \quad (6)$$

where
vd3: an Abbe number for d-line of the third lens
vd4: an Abbe number for d-line of the fourth lens.

7. The imaging lens according to 3,
wherein the following conditional expression (6) is satisfied;

$$27<(vd3+vd4)/2-vd2<34 \tag{6}$$

where
vd3: an Abbe number for d-line of the third lens
vd4: an Abbe number for d-line of the fourth lens.

8. The imaging lens according to 4,
wherein the following conditional expression (6) is satisfied;

$$27<(vd3+vd4)/2-vd2<34 \tag{6}$$

where
vd3: an Abbe number for d-line of the third lens
vd4: an Abbe number for d-line of the fourth lens.

9. The imaging lens according to claim 1,
wherein the following conditional expression (7) is satisfied;

$$-30<vd1-(vd3+vd4)/2<-3 \tag{7}$$

where
vd3: an Abbe number for d-line of the third lens
vd4: an Abbe number for d-line of the fourth lens.

10. The imaging lens according to claim 2,
wherein the following conditional expression (7) is satisfied;

$$-30<vd1-(vd3+vd4)/2<-3 \tag{7}$$

where
vd3: an Abbe number for d-line of the third lens
vd4: an Abbe number for d-line of the fourth lens.

11. The imaging lens according to claim 3,
wherein the following conditional expression (7) is satisfied;

$$-30<vd1-(vd3+vd4)/2<-3 \tag{7}$$

where
vd3: an Abbe number for d-line of the third lens
vd4: an Abbe number for d-line of the fourth lens.

12. The imaging lens according to claim 4, wherein the following conditional expression (7) is satisfied;

$$-30<vd1-(vd3+vd4)/2<-3 \tag{7}$$

where
vd3: an Abbe number for d-line of the third lens
vd4: an Abbe number for d-line of the fourth lens.

13. The imaging lens according to claim 5,
wherein the following conditional expression (7) is satisfied;

$$-30<vd1-(vd3+vd4)/2<-3 \tag{7}$$

where
vd3: an Abbe number for d-line of the third lens
vd4: an Abbe number for d-line of the fourth lens.

14. The imaging lens according to claim 6,
wherein the following conditional expression (7) is satisfied;

$$-30<vd1-(vd3+vd4)/2<-3 \tag{7}$$

where
vd3: an Abbe number for d-line of the third lens
vd4: an Abbe number for d-line of the fourth lens.

15. The imaging lens according to claim 7,
wherein the following conditional expression (7) is satisfied;

$$-30<vd1-(vd3+vd4)/2<-3 \tag{7}$$

where
vd3: an Abbe number for d-line of the third lens
vd4: an Abbe number for d-line of the fourth lens.

16. The imaging lens according to claim 8,
wherein the following conditional expression (7) is satisfied;

$$-30<vd1-(vd3+vd4)/2<-3 \tag{7}$$

where
vd3: an Abbe number for d-line of the third lens
vd4: an Abbe number for d-line of the fourth lens.

17. The imaging lens according to claim 1,
wherein the following conditional expression (8) is satisfied;

$$-2.5<(R8+R9)/(R8-R9)<-0.5 \tag{8}$$

where
R8: a radius of curvature of a surface of the fourth lens on the object side
R9: a radius of curvature of a surface of the fourth lens on the image side.

18. The imaging lens according to claim 2,
wherein the following conditional expression (8) is satisfied;

$$-2.5<(R8+R9)/(R8-R9)<-0.5 \tag{8}$$

where
R8: a radius of curvature of a surface of the fourth lens on the object side
R9: a radius of curvature of a surface of the fourth lens on the image side.

19. The imaging lens according to claim 1,
wherein the following conditional expression (9) is satisfied;

$$40°<2\omega<60° \tag{9}$$

where
$2\omega$: a maximum full angle of view, the unit of which is degree (°).

20. An imaging apparatus comprising:
the imaging lens according to claim 1.

* * * * *